(12) United States Patent
Eid et al.

(10) Patent No.: US 6,502,042 B1
(45) Date of Patent: Dec. 31, 2002

(54) FAULT TOLERANT LIQUID MEASUREMENT SYSTEM USING MULTIPLE-MODEL STATE ESTIMATORS

(75) Inventors: Bradley F. Eid, Greenwood, IN (US); Radoslaw R. Zakrewski, South Burlington, VT (US); Mark G. Walker, Mission Viejo, CA (US)

(73) Assignee: BFGoodrich Aerospace Fuel and Utility Systems, Vergennes, VT (US)

( * ) Notice: Subject to any disclaimer, the term of this patent is extended or adjusted under 35 U.S.C. 154(b) by 5 days.

(21) Appl. No.: 09/697,674

(22) Filed: Oct. 26, 2000

(51) Int. Cl.$^7$ ................................................. G06E 19/00
(52) U.S. Cl. ......................................... 702/50; 702/54
(58) Field of Search ......................... 702/54; 365/516; 701/34; 364/552; 73/290

(56) References Cited

U.S. PATENT DOCUMENTS

| | | | |
|---|---|---|---|
| 5,479,360 A | * 12/1995 | Seif et al. | 364/516 |
| 5,642,296 A | * 6/1997 | Saxena | 364/552 |
| 6,006,604 A | * 12/1999 | Rabelo et al. | 73/290 |
| 6,115,654 A | * 9/2000 | Eid et al. | 701/34 |
| 6,157,894 A | * 12/2000 | Hess et al. | 702/54 |

OTHER PUBLICATIONS

J. Chie and R. J. Patton, *Robust model–based fault diagnosis for dynamic systems*, Kluwer, 1999–introductory section 1.1, pp. 1–7.

R.B. Brooks and S. S. Iyengar, *Multi–sensor fusion: fundamentals and applications with software*, Prentice Hall, 1998–Chapter 2, pp 21–50.

J. J. Gertler, *Fault detection an diagnosis in engineering system*, Marcel Dekker, 1998–Chapter 11,, pp. 363–415.

Y. Bar–Shalom and X.R. Li, *Estimation and tracking: principles, techniques, and software*, Artech house 1993–Section 5.4 p. 235–250.

D. T. Magill, "Optimal adaptive estimation of sampled stochastic processes.", IEEE *Transactions on Automatic Control*, vol. 15, 10–17, 1970.

(List continued on next page.)

Primary Examiner—John S. Hilten
Assistant Examiner—Xiuqin Sun
(74) Attorney, Agent, or Firm—James M. Rashid; Calfee, Halter Griswold LLP

(57) ABSTRACT

A fault tolerant liquid measurement system includes a plurality of sensors for measuring parameters of a liquid in a container; each sensor generating a measurement signal representative of the liquid parameter measured thereby. The sensors are grouped into a number of sets, each set including some sensors of another set. The measurement signals of each set of sensors are processed in a processor to determine for each set of sensors a first estimate signal representative of a likelihood of measurement signal validity for the measurement signals of the corresponding set, and a second estimate signal representative of liquid quantity in the container based on the measurement signals of the corresponding set. The processor further determines a third estimate signal of liquid quantity in the container based on a function of the first and second estimate signals.

56 Claims, 11 Drawing Sheets

OTHER PUBLICATIONS

G. A. Ackerson and K. S. Fu. "On state estimation of sampled stochastic processes", *IEEE Transactions on Automatic Control*, vol. 15, 10–17, 1970.

D. G. Lainiotis, *Partitioning: a unifying framework for adaptive systems*, I: estimation, *Proceedings of the IEEE*, vol. 64, 1127–1143.

Y. Bar–Shalom and X.-R. Li, *Estimation and tracking: principles, techniques, and software,* Artech House, 1993–Section 11.6, pp. 446–483.

S. N. Shelodon and P. S. Maybeck, "An optimizing design strategy for multiple model adaptive estimation and control." *IEEE Transactions on Automatic Control*, vol. 38, 651–654, 1993.

K. A. Loparo, M.R. Buchner and K. S. Vasudeva, "Leak detection in an experimental heat exchanger process: a multiple model approach", *IEEE transactions on Automatic Control*, vol. 36, 167–177, 1991.

T.E. Menke and P. S. Maybeck, "Sensor/actuator failure detection in the Vista F–16 by multiple model adaptive estimation", *IEEE Transactions on Aerospace and Electronics System*, vol. 31, 1219–1229, 1995.

* cited by examiner

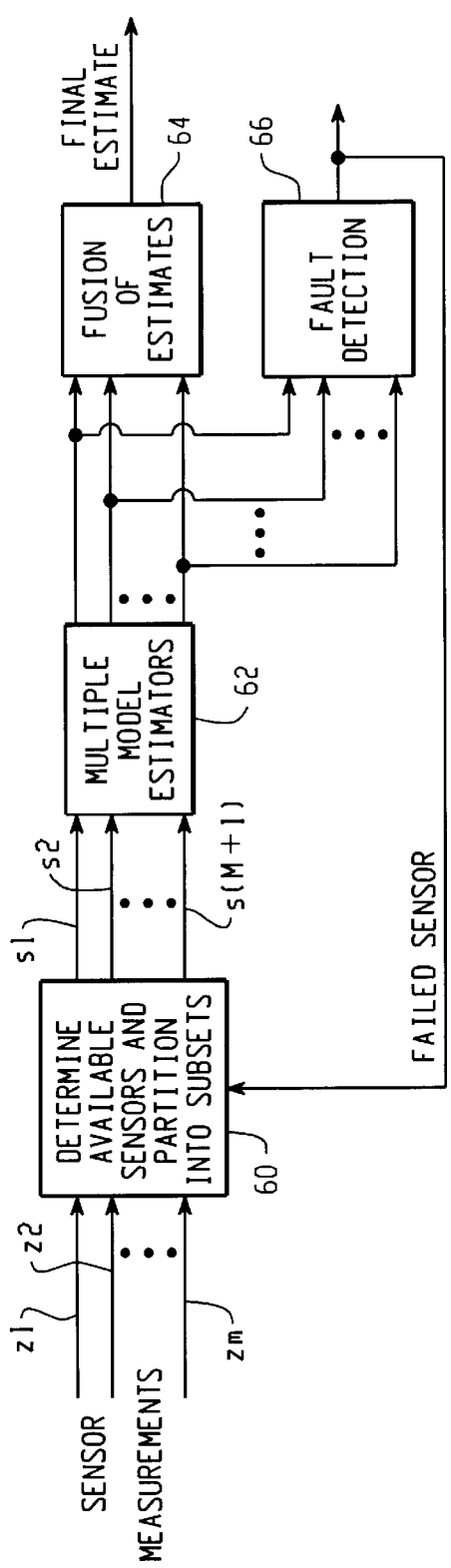
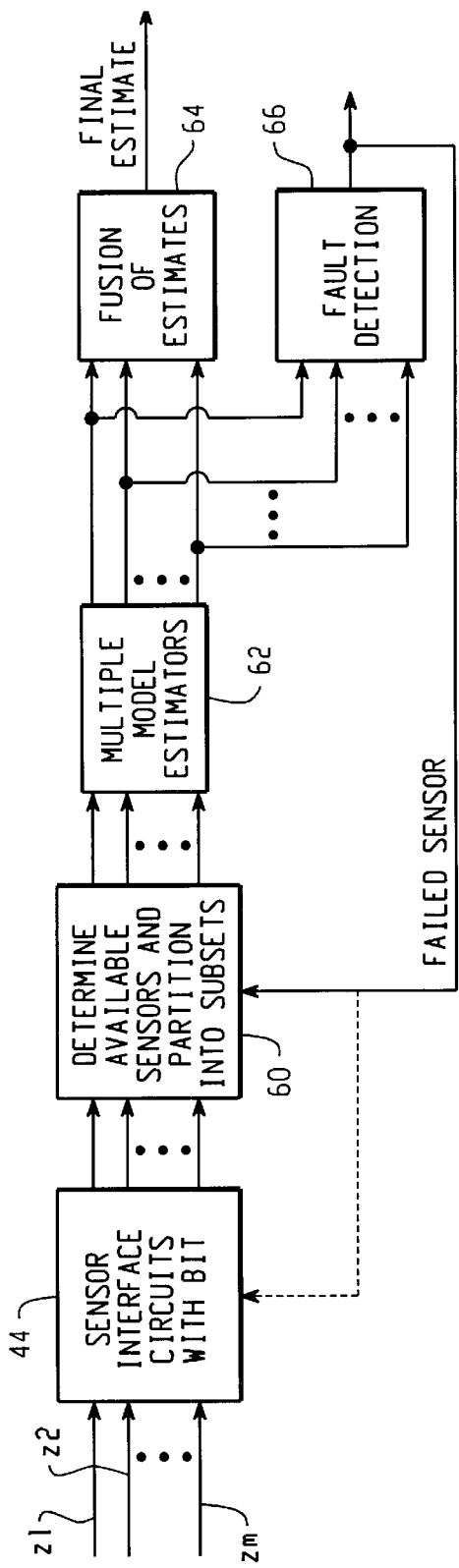
Fig. 3
Fig. 6

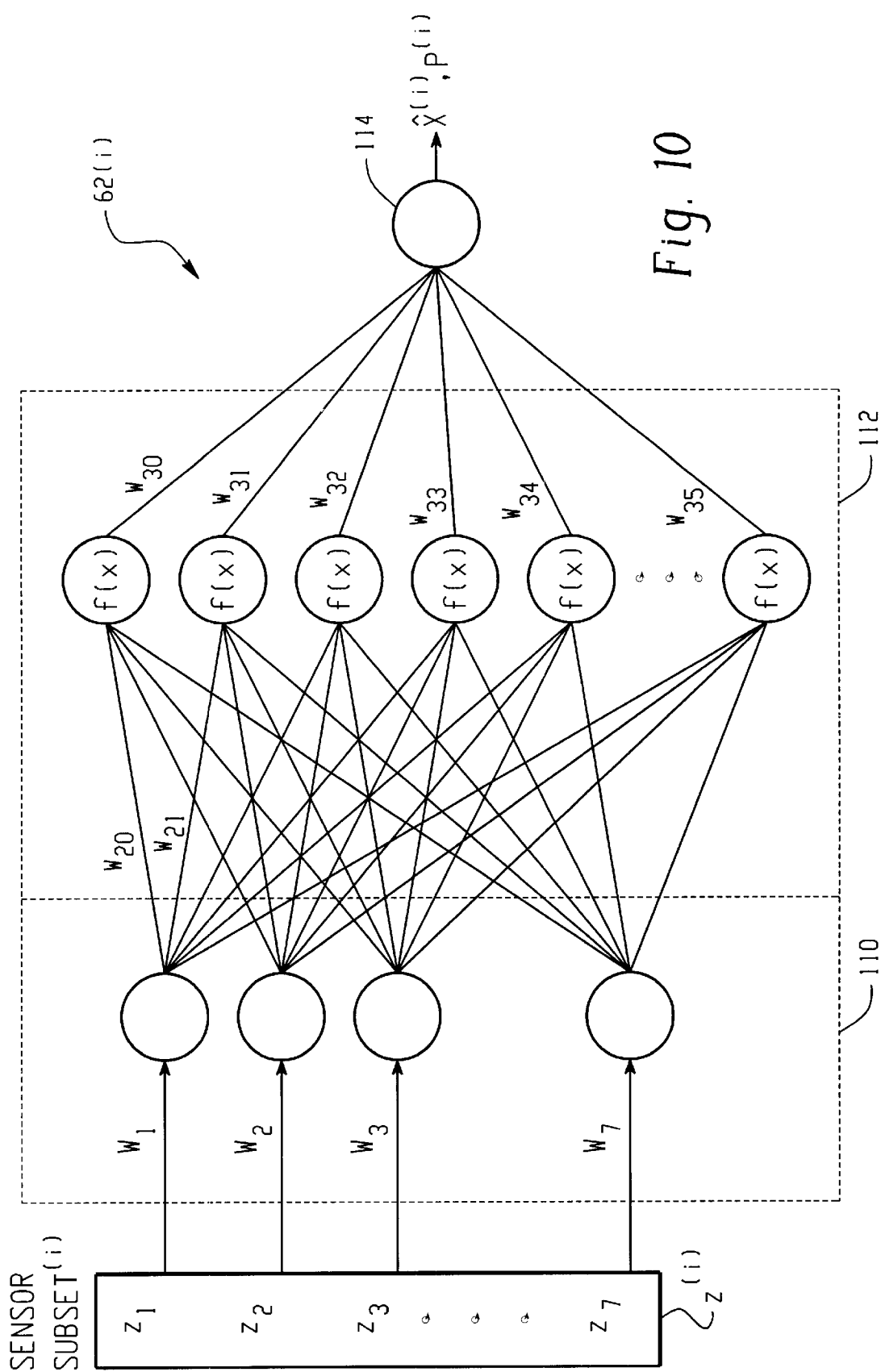

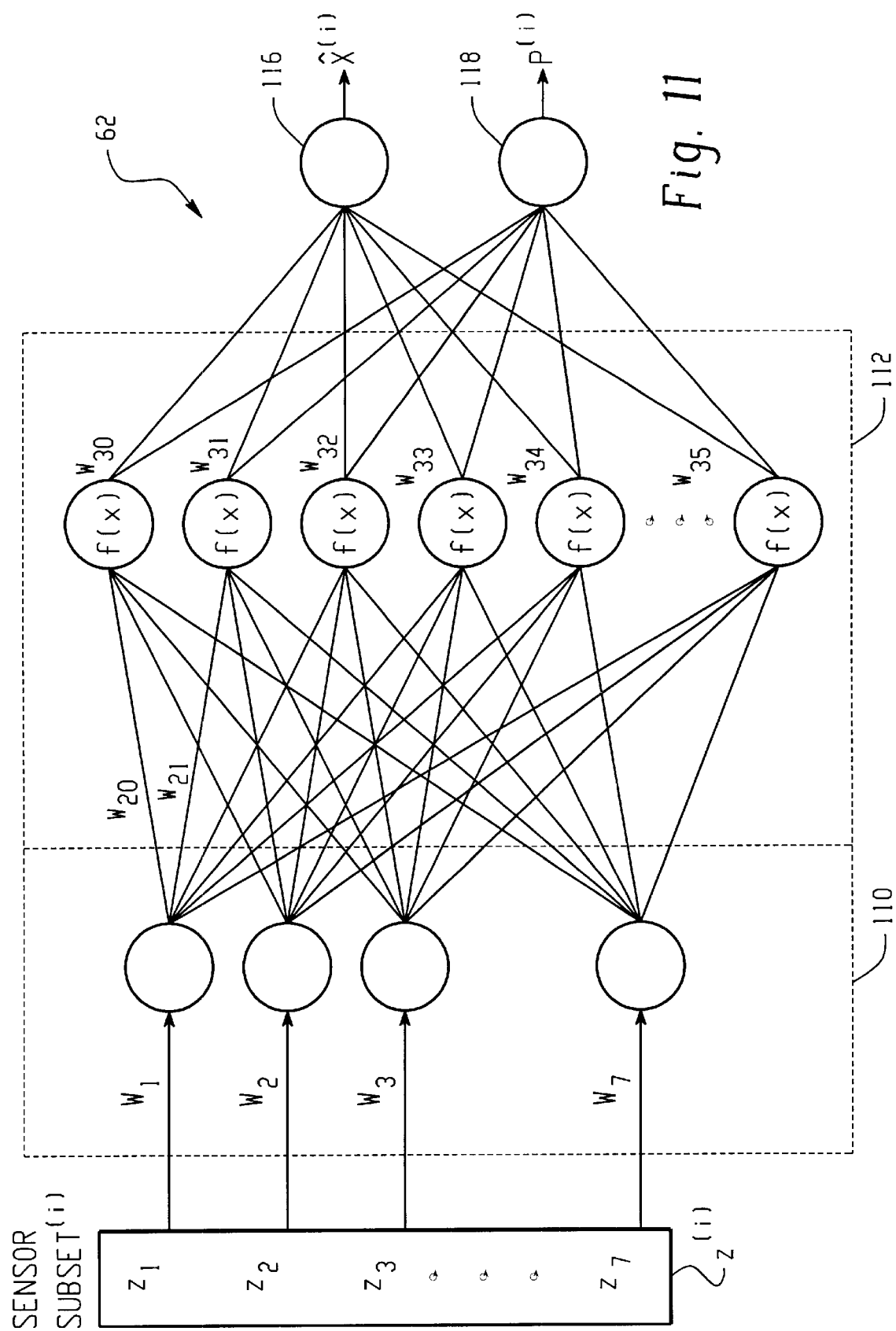

FAULT TOLERANT LIQUID MEASUREMENT SYSTEM USING MULTIPLE-MODEL STATE ESTIMATORS

BACKGROUND OF THE INVENTION

The present invention is directed to fault tolerant liquid quantity measurement systems, in general, and more particularly, to fault tolerant liquid quantity measurement system using multiple model state estimators.

Liquid quantity measurement systems, like an aircraft fuel gauging system, for example, may be physically compartmentalized into tanks remotely located from each other and each tank may have compartments or sections referred to as bays. The tanks and bays of the system may encounter significantly different environmental and operational conditions, such as temperature, vibration, aeration, attitude and the like. To provide accurate liquid quantity measurements under these conditions, each tank, and possibly even each bay thereof, may be instrumented with its own set of sensors to measure the liquid parameters affected by these conditions. Accordingly, the liquid quantity of each tank and/or bay may be independently computed utilizing the corresponding set of sensors in each case, and the total quantity may be computed as the sum of the individual quantities. With the total amount of sensors used in the overall liquid quantity system, it is of paramount importance to include a level of fault tolerance in the system to maintain reliability for flight critical operations. While the present systems are considered reliable, there is always room for improvement.

Current systems offer some degree of fault tolerance by including built-in-test (BIT) circuitry in the interface modules which receive and signal condition the various sensor signals for a tank and/or bay thereof. In addition, the sensors may be divided redundantly for inputing to separate interface modules for added tolerance to a fault in an interface module, for example. Still further, presently proposed systems offer sensor fusion techniques for computing liquid quantity. Some sensor fusion techniques are considered to offer built-in fault tolerance without explicit fault detection. Competitive sensor fusion techniques, for example, operate with physical sensor redundancy, whereby a number of homogeneous sensors measure the same physical quantity, and simple algorithms, such as averaging, trimmed averaging, rank selection filtering or other voting schemes may be used to provide fault tolerance without explicit fault detection. In order for these systems to work, more than half of the sensors must function properly so they can form a majority. For example, in order to detect an accelerometer sensor failure through competitive fusion techniques, it is necessary to use at least three separate accelerometers.

Other sensor fusion techniques use analytical redundancy instead of physical redundancy whereby the sensors measure parameters that depend on each other via a set of equations. Thus, the outputs of each sensor may be predicted from the outputs of the other sensors. In these type systems, fault tolerance is achieved via appropriate partitioning of the sensor set. For example, suppose that the fuel mass of an aircraft were calculated by a number of algorithms that use different subsets of sensors, this would result in a set of fuel mass estimates. Then, trimmed averaging, median filtering, or other voting scheme could be used to reject or discount outliers caused by a sensor failure. But, this technique requires that for any single sensor fault, more than half of the competing algorithms remain unaffected.

Accordingly, such sensor fusion techniques as herein above described alone will not render the system single-fault tolerant, and there is still a need for a separate fault detection module. The present invention is directed to a fault tolerant system which overcomes the drawbacks of the aforementioned systems and offers an implicit sensor diagnosis performed in conjunction with the sensor fusion process itself.

SUMMARY OF THE INVENTION

In accordance with one aspect of the present invention, a fault tolerant liquid measurement system comprises: a plurality of sensors for measuring parameters of a liquid in a container; each sensor generating a measurement signal representative of the liquid parameter measured thereby; means for grouping said sensors into a number of sets, each set including some sensors of another set; and processing means for processing the measurement signals of each set of sensors to determine for each set of sensors a first estimate signal representative of a likelihood of measurement signal validity for the measurement signals of the corresponding set, and a second estimate signal representative of liquid quantity in the container based on the measurement signals of the corresponding set, said processing means for determining a third estimate signal of liquid quantity in the container based on a function of the first and second estimate signals.

More specifically, the fault tolerant liquid measurement system comprises: a number M of sensors for measuring the parameters of the liquid; means for grouping the M sensors into M+1 subsets, one subset including all M sensors and said other M subsets each including all of the M sensors except one and said missing sensor in each of said other M subsets is a different sensor of said M sensors; and processing means for processing the measurement signals of each subset of sensors with a respectively corresponding algorithm based on a state estimation model to determine for each subset of sensors a first estimate signal representative of a likelihood of measurement signal validity for the measurement signals of the corresponding subset, and a second estimate signal representative of the liquid quantity based on the measurement signals of the corresponding subset; the processing means for determining a third estimate signal of the liquid quantity based on a function of said first and second estimate signals.

In accordance with another aspect of the present invention, a system for detecting a faulty measurement signal comprises: means for grouping the sensors into a number of sets, each set including some sensors of another set; and processing means for processing the measurement signals of each set of sensors to determine for each set of sensors a signal representative of a likelihood that at least one of said measurement signals of the corresponding set is a faulty measurement signal, said processing means for detecting a faulty measurement signal of liquid quantity in said container based on a function of said likelihood signals.

BRIEF DESCRIPTION OF THE DRAWINGS

FIG. 3 is a block diagram schematic of a multiple model estimator embodiment suitable for use in the embodiment of FIG. 1.

FIG. 6 is a block diagram schematic of an alternate embodiment to the embodiment of FIG. 3.

FIG. 10 is a more detailed functional schematic of the neural network embodiment of FIG. 8.

FIG. 11 is a more detailed functional schematic of the neural network embodiment of FIG. 9.

DETAILED DESCRIPTION OF THE INVENTION

Figure 1:
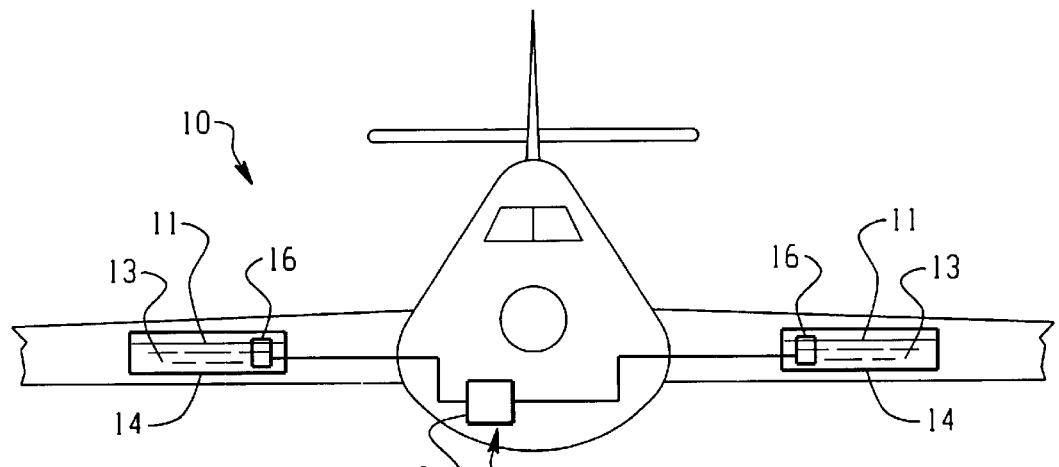
FIG. 1 is an illustration of an embodiment of the present invention in an exemplary application.

With reference to FIG. 1, an embodiment of the invention is illustrated in an exemplary application, in this case for fuel gauging on an aircraft. Although the invention is described herein specifically in the context of aircraft fuel gauging, this is for purposes of illustration and explanation and should not be construed in a limiting sense. Those skilled in the art will appreciate that the present invention will have application to any liquid gauging application in which it is desired to determine the quantity of liquid in a container.

In FIG. 1 an aircraft 10 is shown with an on-board fault tolerant fuel measurement/gauging system 12 in accordance with the present invention. In this example, the gauging system 12 is used to estimate the quantity of a fuel 13 in one or more fuel tanks or bays thereof 14. The term "quantity" as used herein, either as fuel quantity or liquid quantity, refers to any units of measure or quantification of the liquid 13 that defines its volume, weight, mass or combination thereof. The basic relationships are:

$$\text{Mass} = \text{Volume} * \text{Density} \quad \text{or} \quad M = V * \rho \quad \text{Eq. 1}$$

and $$\text{Weight} = \text{Mass} * \text{Acceleration} \quad \text{or} \quad W = M * a \quad \text{Eq. 2}$$

The mass of the fuel 13 in a tank or bay 14 is of particular interest because the total fuel mass determines the energy available to power the aircraft 10. Direct quantity measurement sensors in a dynamic environment such as an airplane are not available. Therefore, liquid quantity is a value derived from measurements and calculations of other parameters of the fuel 13 including density, acceleration and fuel height in the tank. These and other parameters are either measured by various sensors 16 (collectively designated in FIG. 1) including but not limited to capacitive sensors, pressure sensors, ultrasonic level sensors, accelerometers and temperature sensors, or derived from such measurements and other calculations.

As used herein, a parameter of the liquid in the container, or a "liquid parameter" includes any characteristic of the liquid that can be measured, detected or derived by calculation or other technique. More particularly, a measured or detected liquid parameter includes any characteristic of the liquid (such as, for example, echo travel time, temperature, pressure, capacitance and so on) and/or an external parameter that acts on the liquid, such as for example, force of acceleration. These various parameters are exemplary in nature and are not intended to be exclusive or limiting in any sense. A derived parameter of the liquid is any parameter or characteristic or property of the liquid that is determined or calculated or otherwise derived from one or more of the measured parameters and/or other information available to the system, such as, for example, fuel plane height, density, and velocity of sound (VOS). Again these derived parameters are exemplary in nature and should not be construed in a limiting sense.

Some, one, or all of the sensors 16 can be disposed inside a tank or bay thereof 14 if the sensor design so dictates. However, it is understood that some or all of the sensors 16 may be non-intrusive, meaning that a sensor(s) is (are) not exposed electrically to the fuel 13 and/or otherwise installed or disposed inside a tank 14. In general, a non-intrusive sensor for purposes of this disclosure is a sensor that can be installed at and removed from its operational location with a tank 14 without having to remove fuel 13 from the tank 14 or without significant loss of fuel from the tank 14 when a sensor is removed, and/or is a sensor that operates without exposing the fuel 13 to electrical energy. But, it is important to note that the invention can be used with all intrusive sensors such as capacitive probes or pressure sensors, for example, without deviating from the broad principles thereof.

The sensors 16 produce output measurement signals, typically in the form of electrical signals, which are coupled or input to a fuel gauging processor 18. Typically, the processor 18 will be a computer or functionally similar electronic hardware and software combination that processes the sensor 16 measurement signals and determines quantity of the fuel 13 in a tank 14 notwithstanding one or more faulty measurement signals in accordance with the techniques of the present invention.

Figure 2:
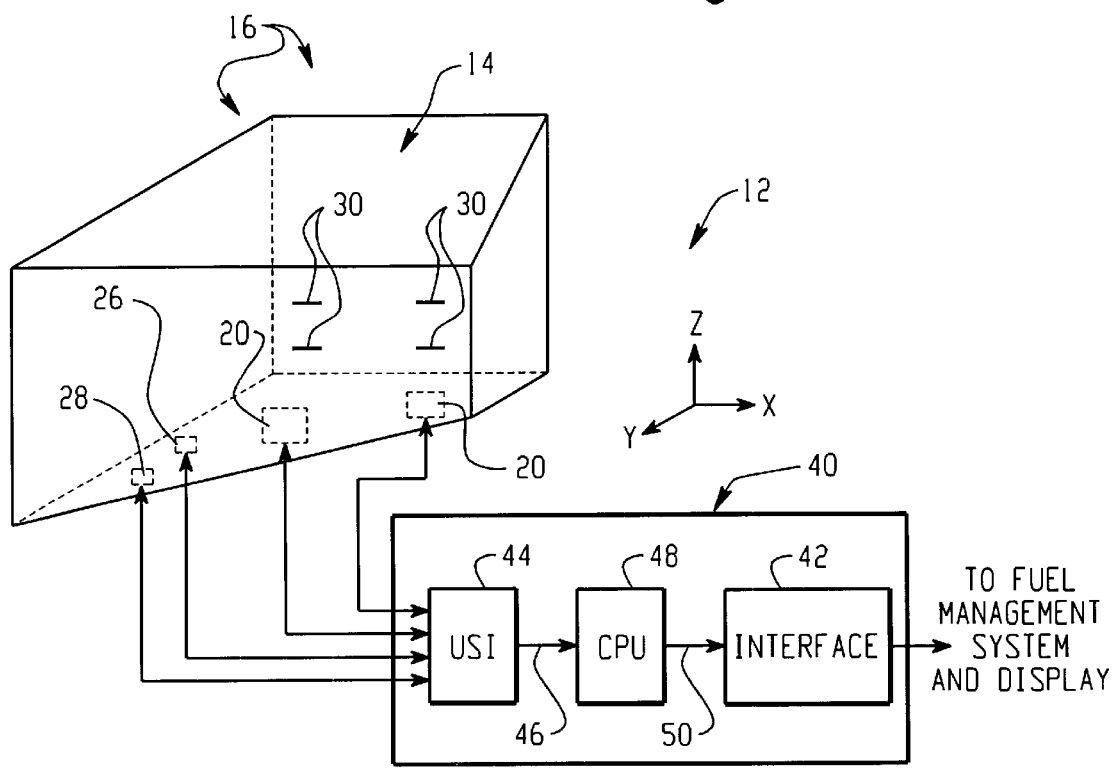
FIGS. 2 and 2A are illustrations of the embodiment of FIG. 1 shown in greater detail.
Figure 2A:
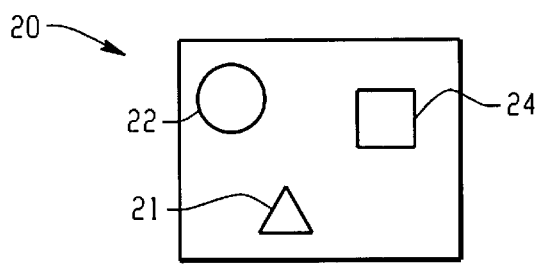

With reference next to FIGS. 2 and 2A, the fault tolerant fuel gauging system 12 includes the sensors 16 which are in FIGS. 2 and 2A illustrated in more detail as to organization. It is contemplated that a number of sensors 20 may be located in close proximity to each other at the fuel tank or bay 14 and may include, in one embodiment, an ultrasonic level sensor 22, a temperature sensor 24 and an accelerometer 21. These sensors 20 are illustrated in FIG. 2A using different geometric shapes (e.g. a circle for the ultrasonic sensor 22, a square for the temperature sensor 24 and a triangle for the accelerometer 21) to emphasize that the present embodiment contemplates the use of a number of different or heterogeneous sensors that detect or measure different parameters of the fuel, such as echo travel time, pressure, acceleration and temperature, for example. Pressure sensors 26 and 28 may be also disposed at different heights at the tank or bay 14. The pressure sensors 26 and 28 are preferably disposed at the maximum depth of the tank or bay 14, and conveniently can be a differential pressure sensor so that the pressure measurement is inherently compensated for ullage and ambient pressures. While sensors 16 have been described as sets of dissimilar sensors for the present embodiment, it is understood that sensors 16 may also include sets of similar sensors as well without deviating from the principles of the present invention.

The ultrasonic type sensors 22, of which there are two, used in this example, respectively include a pair of acoustic targets 30. The targets are used to permit a determination of the velocity of sound (VOS) through the fuel 13. The targets 30 can be disposed inside the tank 14 and are simply physical elements that serve as acoustic energy reflectors. It is contemplated that rigid fixed structural elements that are inherently part of the tank or bay 14 design (such as for example, pipes, walls and so on) can be conveniently used for the acoustic targets 30, thereby obviating any need to add any structures to the tank 14 interior. While two targets are used for each sensor 22 in the present embodiment, it is understood that one or more than two may be used just as well. Actually, the system 12 can function without any targets, albeit at a somewhat degraded performance level.

All in all, in the present embodiment, there are eight sensors for each tank or bay 14, namely two ultrasonic sensors 22, two accelerometers 21, two temperature sensors 24 and two pressure sensors 26 and 28 and it is the grouping of these different sensors 16 into a number of sets or subsets that is one of the fundamental underlying concepts of the present invention, as will be described shortly.

A suitable ultrasonic sensor 22 could be part no. 20182-0101 available from Simmonds Precision Aircraft Systems, Inc.; a suitable temperature sensor 24 is a standard temperature sensor such as part no. 8752 available from Norwich Aerospace; and a suitable pressure sensor 26 and 28 is part no. 19C030A-4 available from Sensym Inc. The accelerometer 21 is preferably a three axis accelerometer that outputs acceleration information as the aircraft maneuvers.

The fault tolerant gauging system 12 further includes a computer system 40. The computer system 40 may be part of the airplane fuel management system computer (not shown), or a separate processing unit that interfaces with the fuel management system through an appropriate interface function 42. The computer system 40 includes a hardware and software architecture that controls the overall operation of the fuel gauging system 12, including control of the sensor 16 operation, executive management of the various estimation algorithms, and control of the interface with down stream processing functions. Details of a suitable software architecture for the computer system 40 are provided in the co-pending patent application bearing application Ser. No. 08/997,137, entitled "Blackboard Centric Layered Software Architecture For an Embedded Airborne Fuel Gauging Subsystem", and assigned to the same assignee as the instant application, which application being incorporated herein by reference. The present invention, however, does not depend on nor does it require the use of an overall executive computer system 40 as part of the fault tolerant fuel gauging system 12. Rather, the present invention is directed to liquid gauging using a merging of fault tolerant and state estimation models and concepts, in the form of algorithms executed by a processor 48, that can be implemented in combination with an overall fuel gauging computer system such as the system 40.

A sensor interface section 44 that may include one or more universal sensor interface (USI) modules that may be part of the computer system 40 as shown or disposed at remote locations thereof. Also, the measurement signals of the sensors 16 may be physically divided up such that some are coupled to one USI module and others are coupled to another and so on in order to provide tolerance with respect to USI module failures. Moreover, the USI modules may be located close to their respective sensor groupings and function as remote sensor concentrators, for example. In the present embodiment, each USI module may include conventional built in test (BIT) circuitry for each of the sensors 16 coupled to the module to detect a sensor failure. Each USI module of interface section 44 functions to independently control and activate the various different sensors 16 coupled thereto and to receive, process and format the measurement signals from the various sensors 16.

The USI modules 44 may provide the sensor 16 measurement signals and indications of faulty sensors, if available, in the form of a time sampled data stream 46 to processor 48. A detailed description of a suitable USI module 44 is provided in the co-pending patent application bearing application Ser. No. 08/997,271, entitled "Universal Sensor Interface System and Method", and assigned to the same assignee as the instant application, which application being incorporated herein by reference. However, the present invention does not require a division of the measurement signals into different USI modules nor even the use of the USI modules or any built in test circuitry for that matter, but rather can alternatively utilize any of a number of conventional circuits well known to those skilled in the art that process the raw sensor 16 measurement signals and present them in a time sampled data format that is compatible as an input to the processor 48.

The processor 48 carries out the functional and computational aspects of the present invention based on the time sampled data stream received from the sensors 16. The processor 48 may be the main processing unit for the computer system 40, with its own hardware and software to carry out the functions described herein after. A suitable processor could be part no. 80486 processor available from Intel Corporation. Thus, the present invention, in terms of a fuel gauging system 12, contemplates use of a processor 48 that receives the sensor 16 measurement signals and estimates fuel quantity in one or more of the tanks or bays 14 even in the presence of one or more faulty measurement signals. The processor 48 can be realized in the form of a microprocessor, a RISC processor, DSP or combinations thereof, for example.

The processor 48 provides an output 50 that can be in any format compatible with the overall fuel management system that will use the data for further analysis and display. It is contemplated that the processor output 50 will include values that indicate quantity of fuel 13 in each tank or bay 14 (or a cumulative quantity for all the tanks or bays 14) expressed in terms of mass and/or volume as required, which quantity values are derived or calculated from one or more algorithms representative of a multiple-model state estimator architecture.

In accordance with the present invention, a multiple-model state estimator architecture suitable for use in programming one or more algorithms executable by the processor 48 is shown in the block diagram schematic of FIG. 3. Referring to FIG. 3, the sensor measurement signals generated by sensors 16 are provided to a functional stage 60 in which the available sensors are determined based on the values of the sensor measurement signals and fault indicators, if available, and are grouped into a number of sets or subsets and the measurement signals of each set or subset s1, s2, . . . , s(M+1) are provided to respectively corresponding state estimator models of stage 62 for estimating a liquid quantity signal and a likelihood of a faulty measurement signal for each model as will become more evident from the description found herein below.

Figure 4:
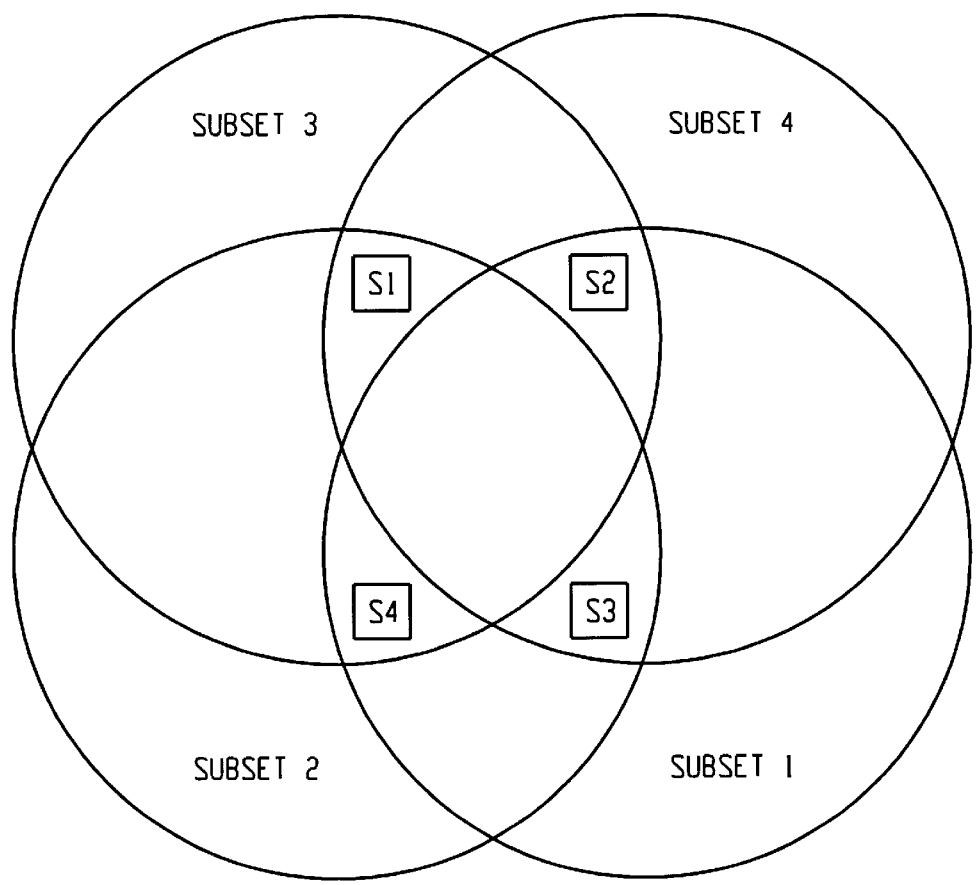
FIG. 4 is a diagram for showing the grouping of sensors into subsets suitable for use in explaining the operation of the embodiment of FIG. 3.

More specifically, the operation of stage 60 of grouping the available sensors into subsets is illustrated by the diagram of FIG. 4 for an exemplary case of four sensors. It is understood that the illustration of FIG. 4 may scale to any number of sensors, but would become difficult to read for numbers greater than four. Referring to FIG. 4, sensor Subset #1 includes all of the sensors S2, S3 and S4, but does not include sensor S1. Similarly, Subset #2 includes all of the sensors except sensor S2, Subset #3 includes all of the sensors except sensor S3, and Subset #4 includes all of the sensors except sensor S4. In general, for M sensors, each of the M subsets will include all of the sensors except one and the missing sensor in each subset will be a different sensor of the M sensors.

In the present embodiment, an additional subset M+1 may include the entire set of all M sensors which can be used to calculate a "global" liquid quantity estimate for the case when no sensor fault or faulty measurement signal is detected. Suppose now that a sensor, say S1, fails or its measurement signal is determined to be faulty. Then, all quantity estimates of the multiple state estimators will be affected, except for Subset #1, which does not use the measurement signals of sensor 1. For the purposes of this description, faults or faulty measurements are considered deviations or discrepancies, larger than what is specified in operating manuals and the like, from the normal behavior in a fuel gauging system or process or its sensors and associated instrumentation and signal processing. For example, a sensor fault may be considered any deviation or discrepancy between the measured and actual values of the individual fuel gauging parameters that is larger than what is being specified in the worst case.

Because the state estimation process of the models of the present embodiment is nonlinear, there is no guarantee that a sensor failure or faulty measurement signal will affect all state estimation model algorithms similarly. Consequently, the liquid quantity estimates of some models may increase, while others may decrease, making it difficult to detect the outlier -the only unaffected model (in this particular case, subset #1). Thus, in order to properly detect a failed sensor and/or faulty measurement signal, each state estimation algorithm of stage 62 may internally assess consistency of its measurement signal inputs and compare the assessment to consistency reported by the remaining model algorithms of stage 62. Then, a fusion stage comprising modules 64 and 66 combines outputs of the state estimation models of stage 62 into a fused final estimate. This is accomplished in the present embodiment by providing higher weighting to those estimation models whose measurement signal input values, when compared with others, yield a better correlation with past measurement signal values and with the state estimation model. With respect to the aforementioned process, it is preferable that each of the liquid quantity estimation models or algorithms be able to assess goodness of its own measurement signal inputs, and output to the fusion stage this assessment or likelihood in a form of a value. For example, a high likelihood value may be indicative of all sensor measurement signals used by a model being valid, and a low likelihood value may be indicative of one or more sensor measurements of the model being faulty. It is further preferable that each of the subsets possess in itself internal redundancy, so that a sensor fault is seen as inconsistency between sensor measurement signal values.

Figure 5:
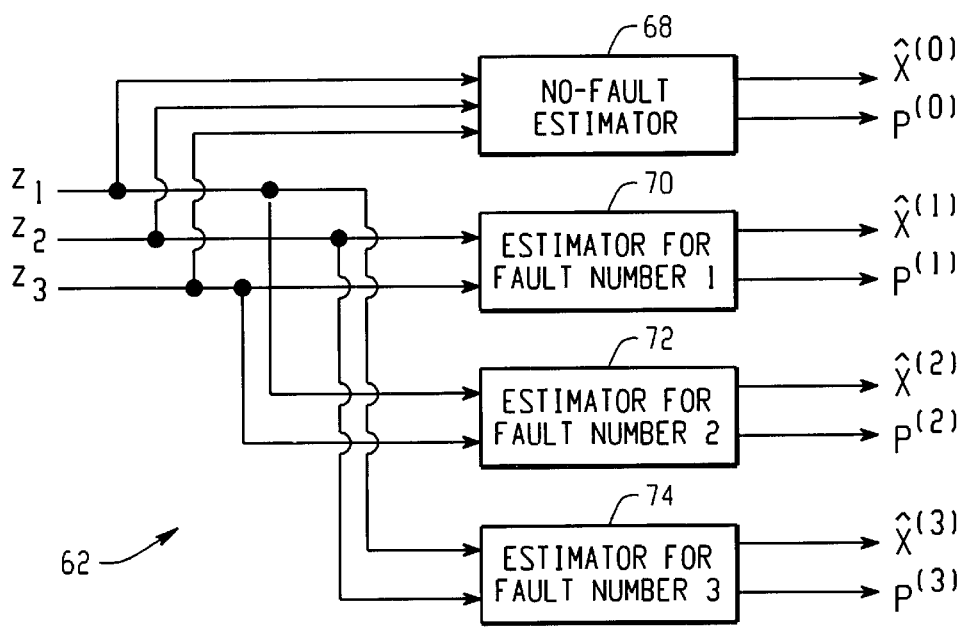
FIG. 5 is a block diagram schematic of a simple multiple model state estimator architecture suitable for use in the embodiment of FIG. 3.

A simplified multiple-model state estimator architecture suitable for use in describing the operation of the functional stage 62 is shown in the block diagram schematic of FIG. 5. The example of FIG. 5 illustrates a multiple model structure for only three sensor measurement signals z1, z2 and z3 which results in four subsets and corresponding state estimation models therefor. It is understood however that this simple example may be expanded for the eight sensors described in connection with FIG. 2 or for that matter, any number of sensors, be they homogeneous or heterogeneous, by merely adding the additional sensor measurement signals and corresponding state estimation models in accordance with the grouping of FIG. 4.

Referring to FIG. 5, all of the sensor measurement signals z1, z2 and z3 are coupled to a model 68 referred to as the No-fault state estimator; signals z2 and z3 are coupled to a model 72 referred to as State estimator for fault #1; signals z1 and z3 are coupled to a model 72 referred to as State estimator for fault #2; and signals z1 and z2 are coupled to a model 74 referred to as State estimator for fault #3. Each of the models 68, 70, 72 and 74 processes its corresponding input sensor measurement signals to generate a signal representative of a liquid quantity measurement signal $X^{(i)}$, i being an index denoting the subset of sensors, and a signal representative of a likelihood value $P^{(i)}$. In general, i may range from 0 to M resulting in M+1 signal pairs X and P.

We may now analyze how sensor faults affect the estimation process of the state estimation models for the exemplary case of FIG. 5. If there is no sensor fault, all four estimators 68, 70, 72 and 74 should produce small prediction errors and relatively high likelihood values $P^{(i)}$. Consequently, all four state estimates of liquid quantity $X^{(i)}$ will contribute to the final estimate of liquid quantity at the fusion stage. Next, suppose that sensor #1 fails and/or produces erroneous or faulty measurement signals. This sensor measurement signal z1 is utilized by estimator models 68, 72 and 74. Since the measurement signals z1 are inconsistent with the remaining sensor signals, estimator models 68, 72 and 74 will produce large prediction errors, and consequently low likelihood values P. On the other hand, estimator model 70 does not utilize the faulty sensor, and its prediction error and likelihood values $P^{(i)}$ will remain unaffected by the sensor failure. Consequently, the final estimate of liquid quantity at the fusion stage will be dominated by the output of estimator 70. Similarly, if sensor #2 or sensor #3 fail, only estimator 72 or 74, respectively, will remain unaffected by the failure and dominate the fused final estimate of liquid quantity as will become more evident from the description found herein below.

It is interesting to note the foregoing described architecture is in a sense a reversal of a traditional fault detector scheme. Usually, it is desired that only one fault detector, specific for a given failure, "fires". But, in the present embodiment, a likelihood value of all valid measurements is calculated under each state estimation model, and the model with the highest likelihood value dominates the fused final estimate. In the case of a sensor fault, then, the outlier (in terms of the likelihood function) is the model with the highest likelihood value. For example, out of M+1 estimators, M of them signal abnormal behavior in case of a fault by generating low likelihood values, and only one continues to operate normally, i.e. the one that does not use the faulty measurement to generate its likelihood value.

The foregoing described multiple-model state estimation embodiment is based on various tacit assumptions. First, it may be assumed that the system remains observable for any specific subset of M−1 sensors. This is a preferable condition for single-fault tolerance, i.e. with any single sensor removed from the available sensors, the multiple-model system will still be able to compute state estimations from the remaining sensor measurement signals. The second assumption is that when the i-th sensor fails, all estimators should register an increase in prediction error, except for the i-th estimator model, which does not utilize that i-th sensor. In other words, in any reduced subset of M−1 sensors there is still sufficient analytical redundancy such that inconsistencies between sensor signals are detected. In effect, it is preferable for the system to remain observable for any two sensor failures.

An important feature of the multiple model estimator is that it does not perform hard switching towards any particular model. Instead, the liquid quantity estimates $X^{(i)}$ of the multiple estimators are weighted at the fusion stage based on their respectively corresponding likelihood values $P^{(i)}$. This approach may be referred to as soft switching. Herein below is found a detailed description for three main variants of the multiple model estimation, namely the ZOA, GPBI and IMM algorithms. A particular advantage of this multiple-model architecture is its great robustness with respect to false fault detection—a paramount consideration in any kind of failure diagnosis scheme. Suppose that the fusion stage of modules 64 and 66 erroneously decides that a sensor failed. Then, the dominating liquid quantity estimate will be produced by the estimator that uses all but one available sensor. Therefore, an erroneous detection of a fault will have only minimal impact on the performance of the system, as only one sensor will be omitted from the state estimation process.

Figure 7A:
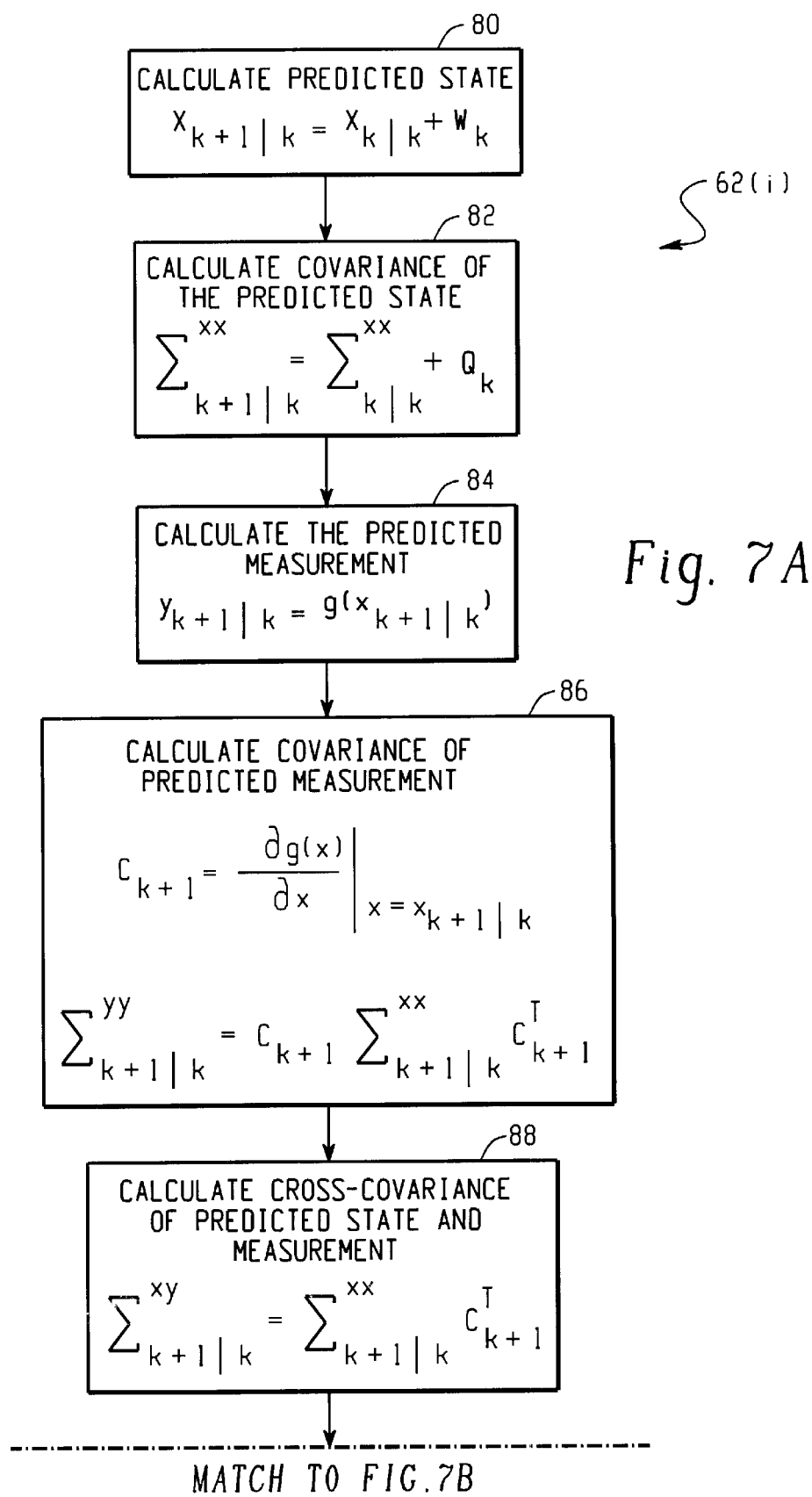
FIGS. 7A and 7B in combination illustrate a software flowchart exemplifying an extended Kalman filter algorithm suitable for use in the embodiment of FIG. 3.
Figure 7B:
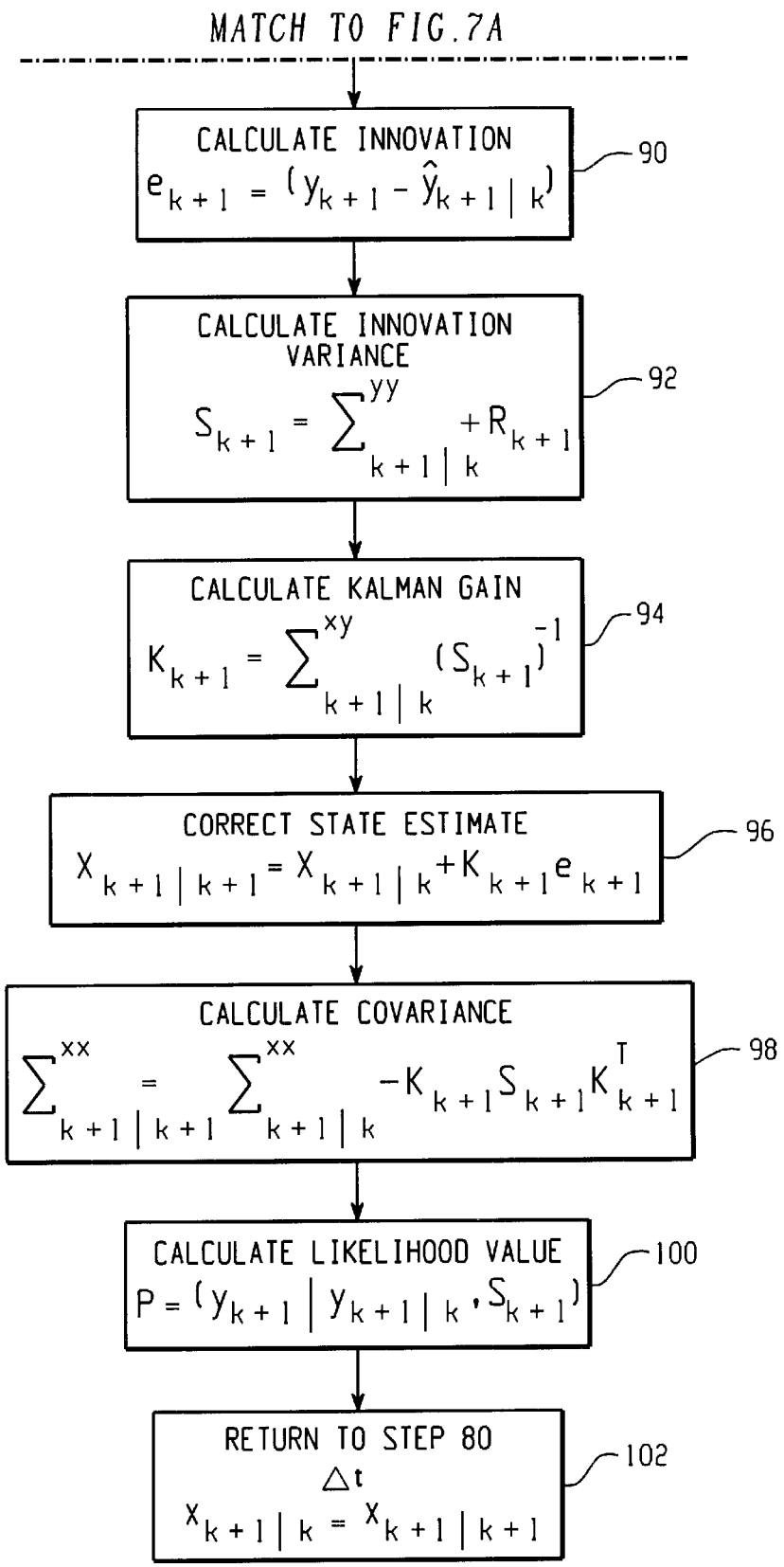

A preferred embodiment for each of the liquid quantity state estimation models of the multiple-model architecture is a recursive state estimator of the extended Kalman filter (EKF) type, and it is preferred that the multiple-model architecture 64 be one of the multiple-model estimation algorithms described herein below. In essence, each EKF model or algorithm i reports its own state estimate of liquid quantity $X^{(i)}$ together with its likelihood value $P^{(i)}$, which measures the agreement (or "correlation") between the sensor measurement signals of its corresponding subset $S^{(i)}$ given their current and past values and the state estimation model. An exemplary Kalman filter suitable for use as a state estimator model is illustrated by the flowchart of FIGS. 7A–7B.

In this embodiment, an extended Kalman filter (EKF) is used for each model because of various non-linear relationships between the sensor measurement signals $z_m$ (16) and the liquid quantity state estimation signal $x_k$. The subscript "k" refers to the state estimation of liquid quantity for the corresponding model at a point in time, k, so that $x_{k-1}$ is the state estimation before it is propagated by a propagation equation to the new state estimation $x_k$. The subscript notation k+1 is used to refer to a predicted state, either in the samples of measurement signals of the corresponding subset or the state estimation. Thus, as an example, $x_{k+1|k}$ is the predicted state of the liquid quantity estimation $x_{k+1}$ based on measurement sampled data processed by the model up to time k. The state estimation $x_k$ is propagated in time (at each $\Delta t$) along with its error covariance matrix and updated for each measurement by operation of the Kalman gain K and the predicted measurement error. The updated state $x_k$ is the state estimation output for each model in this embodiment.

In general, the system model used for an EKF algorithm is non-linear and the function $f$ is a non-linear transformation, but it may be linearized as follows:

$$x_{k+1}=f(x_k)+w_k=\Phi_k x_k+w_k$$

$$y_k=g(x_k)+v_k$$

where $x_{k+1}$ is the state to be estimated, $f$ is the state transition function, $\Phi_k$ is its Jacobian around the previous state estimate $x_k$, $y_k$ is the measurement vector (corresponding to the corresponding subset of measurement signals $z_m$), $g(x_k)$ defines the relationships (i.e. where the relationships are non-linear) between the state estimation and the measurement matrix, $w_k$ is the process noise matrix and $v_k$ is the measurement noise matrix. More specifically, the predicted measurement vector relationship $g(x_k)$ used in the above calculation to determine the predicted measurement vector (i.e. $y_{k+1|k}$) is based on the last state estimate ($x_k$). This calculation may be performed every update cycle $\Delta t$.

In the exemplary embodiment of FIGS. 7A–7B, the predicted state vector $x_{k+1}$ is assumed to be equal to the current state plus noise, or, $$x_{k+1}=f(x_k,w_k)=x_k+w_k$$

In other words, function $f$ is equivalent to multiplication by the identity matrix (as such, $x_{k+1}-x_k=0$). This assumption is based on the $\Delta t$ increment being small compared to dynamic changes in the system 12 so that the estimated state estimation $x_k$ is the same as the preceding state estimation $x_{k-1}$ plus process noise. This non-dynamic system assumption, however, is not required to practice the invention but is used as a convenience to clarify the description of the preferred embodiment. Those skilled in the art will appreciate that the $\Phi_k$ transformation matrix could be used to define dynamic system conditions using the off diagonal values.

For purposes of the disclosed embodiment, noise sequences are assumed to be independent and Gaussian with means of $E(v_k)=0, E(w_k)=0$ and variances $E(v_k v_k)=R_k$ and $E(w_k w_k)=Q_k$. $R_k$ is the variance matrix of the measurement noise, and $Q_k$ is the variance matrix of the process noise. These values can be functions of the system states and/or the measurement input. $R_k$ is estimated for each system 12 based on empirical knowledge. For example, in the described embodiment, the measurement noise is fairly predictable because the sensors 16 including the accelerometers, temperature sensors and pressure sensors, for example, tend to have identifiable output accuracy or tolerances. Thus it is straightforward to assign empirically a value in $R_k$ for each of the measurements in the measurement vector $y_k$. For the described embodiment, $R_k$ is a diagonal matrix, meaning that each measurement is considered to be independent of the other measurements, although this assumption is not required for the invention. The system process noise variance $Q_k$ is based on empirically estimated or predicted variability of the state variables induced by external environmental factors or modeling errors. It is noted again that both $Q_k$ and $R_k$ are estimated as best as the available knowledge of the system 12 will allow, and the algorithm 62 will operate as a sensor fusion process even if the values for $Q_k$ and $R_k$ are not optimal. Determination of $Q_k$ and $R_k$ can be performed for the system 12 using techniques that are conventional for the design of Kalman-type filters. Notwithstanding the foregoing, the values of $Q_k$ and $R_k$ may be either measured or assigned by estimation.

The exemplary embodiment also assumes that the noise terms $w_k$ and $v_k$ are mutually independent, or $E(w_k v_k)=0$ or covariance of the measurement noise and process noise is zero. The purpose of the filter is to calculate estimates of the unmeasured states $x_k$ at time k based on measurements y collected up to time k.

FIGS. 7A–7B provide such an exemplary algorithm in flow diagram form for the EKF algorithm for each model i of the multiple-model stage 62. At step 80, the predicted state $x_{k+1|k}$ is calculated based on the initial assumed state, which can simply be an assumed initial state estimate $x_{0|0} = x_0$. Also, for the initial condition of the Kalman filter, $w_k$ is assumed to be zero (the Kalman filter will adjust for the actual $w_k$ during subsequent iterations). Finally, the initial covariance must also be estimated $\Sigma^{xx} = \Sigma_0$ (the initial covariance estimate can simply be a guess, because the Kalman filter will operate to recalculate it at each $\Delta t$ interval). At step 82 the covariance of the predicted state is calculated by adding $Q_k$ to the initial covariance $\Sigma_0$. It is noted at this time that the algorithm illustrated in FIGS. 7A–7B is written in its generic form to show the calculations that occur for each recursion cycle (propagation and update). The initial cycle uses initial estimated values for the covariance values and state estimation $x_k$ as noted above.

At step 84, the predicted measurement vector $y_{k+1|k}$ is calculated (in accordance with the $g(x_k)$ function) using the initial state vector estimate $x_0$ (i.e. $y_{k+1|k} = g(x_{0|0})$). The function $g(x_k)$ is calculated using the estimated initial values $(x_0)$ for the state elements in the state vector $x_k$. The non-linear output transformation g describes the nominal behavior of the sensors as a function of state x. Function g includes physical properties of the sensors and of the tank. In the case of height sensors, for example, calculation of function g may involve interpolation of height-volume tables, which relates fuel surface height to fuel volume and aircraft's attitude. At step 86, the covariance $\Sigma^{yy}$ is calculated. Because the relationships between the state vector $x_k$ and the measurement vector $g(x_k)$ are non-linear, the covariance calculation is based on a linearization at point $x_{k+1|k}$ using the partial derivative of the $g(x_k)$ function with respect to $x_k$. This partial derivative is commonly referred to as the Jacobian matrix (identified in step 86 as the calculated matrix $C_{k+1}$). The Jacobian matrix $C_{k+1}$ as well as its transform, may be calculated for every recursion of the EKF algorithm as at step 86. At step 88, the cross-covariance of the predicted state $x_{k+1}$ and the predicted measurement $y_{k+1}$ is calculated.

Referring to FIG. 7B, at block 90, a prediction error or innovation is calculated from the difference between the actual measurement values $y_{k+1}$ at time k+1 and the predicted measurement values $y_{k+1|k}$ for time k+1 calculated at step or block 84. Next, in block 92, the innovation covariance $S_{k+1}$ is calculated. Thereafter, the predicted state estimation $x_{k+1|k}$ is updated or corrected (to $x_{k+1|k+1}$) starting at step 94 wherein the Kalman gain $K_{k+1}$ is calculated making use of the innovation variance. At step 96, the state estimate is corrected or updated based on the innovation calculated in block 90 and the Kalman gain. At step 98, the covariance of the new state estimate is calculated, and this becomes the value used at step 96 in the next recursive cycle. Finally, in step 100, the likelihood value $P^{(i)}$ is calculated as the corresponding probability density function calculated at point $e_{k+1}$. Prior to the next recursive cycle, the state estimate $x_{k+1|k+1}$ becomes the updated estimated liquid quantity in block 102 and is propagated again (being used as the state estimate $x_k$) at step 80 of FIG. 7A as the recursive filter 62(i) continues to operate using updated measurements after time $\Delta t$.

The foregoing described series of steps is based on the assumption that the prediction errors calculated at step 90 and referred to as innovations, form a sequence of uncorrelated Gaussian variables with zero mean and covariance $S_{k+1} = \Sigma_{k+1|k} + R_{k+1}$ in step 92. This method assesses model validity using innovations based on multi-dimensional distribution of the innovation. If the model is correct, measurement $y_{k+1}$ has Gaussian distribution with mean $\hat{y}_{k+1}$ and covariance $S_{k+1}$, or equivalently, innovation $e_{k+1}$ has Gaussian distribution with zero mean and covariance $S_{k+1}$.

Accordingly, the likelihood that only valid measurements are present in the current measurement vector $y_{k+1}$, conditioned on the previous measurements, is based on the value of the corresponding probability density function calculated at point $e_{k+1}$ $$p(y_{k+1} | \hat{y}_{k+1}, S_{k+1}) = \frac{\exp\left(-\frac{1}{2} e_{k+1}^T S_{k+1}^{-1} e_{k+1}\right)}{\sqrt{(2\pi)^m \det(S_{k+1})}},$$

which is calculated in step 100. For a more detailed description of an EKF type state estimator reference is made to the copending patent application bearing application Ser. No. 08/996,851, entitled "Liquid Gauging Using Sensor Fusion and Data Fusion" and assigned to the same assignee as the instant application, which application being incorporated herein by reference.

While in the present embodiment a Gaussian approximation is used in the EKF variants described herein above, it is understood that other algorithms may be used just as well to approximate the state probability distribution. Accordingly, other embodiments of multiple state estimators may be used to approximate the state probability distribution with other than a Gaussian distribution, and consequently the likelihood values may be calculated in accordance with such other formula.

Calculation of likelihood values $P^{(i)}$ for different competing models i of the multiple-model architecture allows differentiating between those models that fit the observed data better than the others, even if none of the models is particularly accurate. In the multiple-model estimation schemes, the above likelihood values $P^{(i)}$ are used to generate relative weighting for fusing estimates from the competing models as will become better understood from the description found herein below.

Those skilled in the art will appreciate that the exemplary EKF algorithm of FIGS. 7A–7B is but one example of a recursive Kalman filter type algorithm that can be used for state estimation. Other forms could be used including forms of Kalman filter algorithms with other methods of predicting future measurements and calculating cross-covariance matrices, including linear state transition and covariance intersection method, to name just a few examples. In some systems 12, alternatives to the Kalman type filter may be available, such as those using Monte Carlo-type randomized approximation of non-linearly transformed probability distributions, for example.

Figures 8, 9:
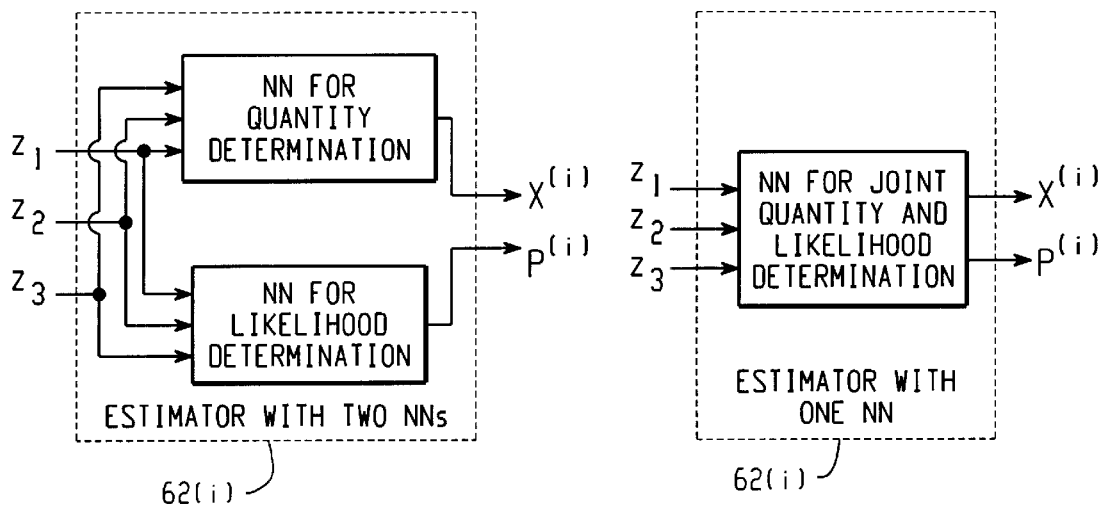
FIG. 8 is a block diagram schematic of a neural network embodiment suitable for use in the embodiment of FIG. 3.
FIG. 9 is a block diagram schematic of an alternate neural network embodiment suitable for use in the embodiment of FIG. 3.

In the alternative, instead of EKF-type estimators, artificial neural networks may be used as the state estimation models. In this case, the likelihood values $P^{(i)}$ (i.e. each model's level of confidence, or likelihood factor) may be provided as an additional output of the same neural network as shown in the block diagram of FIG. 9, or as an output of a separate, auxiliary neural network as shown in the block diagram of FIG. 8. Accordingly, as shown in FIG. 8, each estimator model may consist of two neural nets—one outputting the fuel quantity estimate $X^{(i)}$, and the other producing the likelihood value $P^{(i)}$ corresponding to that estimate. Alternatively, as shown in FIG. 9, a single neural net may output the two values $X^{(i)}$ and $P^{(i)}$. The likelihood values would be used as weighting factors to calculate the final liquid quantity value in module 64 of the fusion stage, just as with the EKF models.

Then, for each sensor subset of measurement signals, the training set for each neural network model would include a mix of training points corresponding to no fault conditions and to single faults of each sensor utilized by the corresponding neural network model. In the exemplary diagram of FIG. 5, this would mean that estimator model 70 would be trained on data corresponding to no faults, and to faults of sensor z2, or sensor z3 and not trained on data corresponding to faults of sensor z1, because it does not use the sensor measurement signal of sensor z1 as its input. A similar set of training points would be selected for models 68, 72 and 74, i.e. each of the remaining models of the multiple-model architecture of stage 62.

The neural network state estimator models of FIGS. 8 and 9 are shown in more specific detail in FIGS. 10 and 11, respectively. With reference to FIG. 10, each of the neural networks of the model 62($i$) that would be executed as an algorithm by the processor 48 may be a feed forward three layer perceptron and that receives the measurement signals $z_m$ of the subset i at respective input nodes of an input layer 110 of the neural network. Each input value may be weighted by a respective weight $w_1, w_2, \ldots w_7$; however, this is not considered preferable in the present embodiment. For the present embodiment as described in connection with FIG. 2, the number of sensors M is eight (8) and therefore, a subset of M–1 sensors would be seven (7). Each neural network of the model 62($i$) may include one hidden layer 112 in this embodiment, with a plurality of nodes, say, for example, thirty-five (35). Each of the input nodes in the input layer 110 is connected to each of the nodes in the hidden layer (in FIG. 10 most of the hidden layer connections have been omitted for clarity). Each of the connections between the nodes is weighted, as is shown (again, most of the weight designations in FIG. 10 are omitted for clarity). Thus, an input to each of the nodes in the hidden layer 112 is a sum of all the weighted outputs from the nodes in the input layer 110. If weights should be used for the input nodes, they may be included in the weights of the hidden layer, for example.

Each neural network of the model 62($i$) also includes, in this embodiment, a single node output layer 114. Each of the nodes in the hidden layer 112 are connected by weights to the output node layer 114. Thus, the input to the single node in the output layer 114 is the sum of all the weighted outputs from each of the nodes in the hidden layer. The output node 114 produces the desired estimate $X^{(i)}$ of quantity of fuel in the tank 14 or the likelihood value $P^{(i)}$, based on its respective training. Values move in the forward direction only in this neural net 62($i$), from input nodes to the output node 114 through the nodes in the hidden layer 112. Values move from every node in the hidden layer 112 to the output node 114 by operation of a non-linear activation function f(x). In this exemplary embodiment, the activation function f(x) is the same for each node in the hidden layer 112 and is the sigmoidal function:

$$f(x)=1.0/[1+e^{-x}].$$

In other words, each hidden layer 112 node input, call it x, is the sum of all the weighted inputs from all the nodes in the input layer 110, and each hidden layer 112 node output is the sigmoidal function f(x). Other activation functions can be selected if appropriate for a particular application. The activation function of the output node is simply a linear sum function so that the output $X^{(i)}$ or $P^{(i)}$ of the output node 114 is simply the sum of all the weighted inputs received from each node in the hidden layer 112.

Alternatively, if desired, the outputs $X^{(i)}$ and $P^{(i)}$ could be determined by the same neural network as shown in FIG. 11 by way of example. The neural network example of FIG. 11 is substantially similar in structure and operation to that described for FIG. 10 except that, in this embodiment, instead of a single node output layer 114, there are two output nodes 116 and 118 for generating the estimation signals $X^{(i)}$ and $P^{(i)}$, respectively. Accordingly, each of the nodes in the hidden layer 112 are connected by weights to both of the output nodes 116 and 118. Thus, the input to the single node in the output layer 114 is the sum of all the weighted outputs from each of the nodes in the hidden layer and the output nodes 116 and 118 respectively produce the desired outputs $X^{(i)}$ of quantity of fuel in the tank 14 and the likelihood value $P^{(i)}$, based on its respective training.

While the neural networks have been described herein above in connection with the processing of the measurement signal subsets of each, it should be clarified that in some, or even most, cases the measurement signals of the subsets will include both current and past measurement samples. This will not affect the overall use of the neural network other than to increase the number of input nodes. For example, if the network is expected to process the current and one set of past measurement samples, then the number of input nodes will double to accommodate all of the measurement samples. Likewise, to accommodate current and two past samples of each measurement signal, the input nodes would have to triple, and so on. This accommodation may not always be a doubling or tripling of input nodes, because not all of the processing of measurement signals include the same number of past measurement samples. Some measurement signals have response times slower or faster than others and thus, will include fewer or more past measurement samples, respectively. In general, then, the neural network, referred to as a time delay neural network, will use as many input nodes as current and past measurement samples it is processing and the training thereof will include a sufficient number of data points to simulate the proper and faulty conditions of the current and past measurement samples. For a more detailed description of time delay neural networks reference is made to the copending patent application bearing application Ser. No. 08/986,851, entitled "Liquid Gauging Apparatus Using a Time Delay Neural Network", and assigned to the same assignee as the instant application, which application being incorporated herein by reference.

The neural networks of stage 62 may be trained using a large number of input data sets to accommodate both current and past measurement samples of the measurement signal inputs. These data sets may be obtained by a process of computer simulation of sensor operation for an expected range of operating and fault conditions. A first step would be to define a number of possible values of tank attitude, temperature, density, volume and so forth given the expected operating envelope of the aircraft. Then, for each combination of these values, the expected and faulty measurement values of the sensor outputs are calculated using tank geometry and known nominal physical properties of the sensors, possibly including random measurement errors of the sensors. The calculated values of the sensor outputs of a subset for a single combination of the operating and fault conditions form training data points for the neural networks of stage 62.

In the present embodiment, the weights of the neural network may be all randomly assigned prior to training, and the training is achieved using the back propagation algorithm as taught in *PARALLEL DISTRIBUTED PROCESSING,* Rumelhart, et al., The MIT Press, Cambridge, Mass. (1988), or other suitable training algorithms. Another suitable training algorithm is taught by *FUNDAMENTALS OF ARTIFICIAL NEURAL NETWORKS,* Hassoun, The MIT Press, Cambridge, Mass.

(1995), for example. After training, the weights are stored and remain fixed. Each neural net model then operates in real time using data from its corresponding measurement subset $z_m$, and directly computes the desired output at each measurement interval Δt. If desired, the output layer 114 for example can include more output nodes to provide a determination of parametric values such as density, temperature, pressure and acceleration, for example, requiring a more extensive training process. For a a more detailed description of the training of neural networks reference is made to the above referenced patent application Ser. Nos. 08/996,851 and 08/997,271.

An advantage of the neural net approach is that each estimator will be trained to provide the optimal estimate under faulty conditions. Therefore, even if the fault diagnosis is erroneous, each of the competing estimators will provide a more or less accurate liquid quantity estimate. Typically, most error detection schemes are recursive algorithms that utilize past input history to assess goodness of the current readings. Therefore, it would be entirely desirable to have a recurrent neural net performing this function. As an alternative, however, the time delay neural network referred to herein above can be used to provide the desired estimation value or values as the case may be.

To summarize, the concept of multiple-model liquid quantity estimation may be used for sensor fault accommodation as exemplified in the block diagram schematic of FIG. 5. Assume that the gauging system equipped with M sensors is potentially single-fault tolerant. That is, it is assumed that for any single sensor fault it is possible to continue gauging, provided that the fault has been detected. To eliminate a need for explicit fault detection, a separate state estimator is included for each of possible M sensor faults. In addition, one model assumes no sensor failure (all sensors fully operational). This results in a total of K=M+1 estimation models. Since the specific way each sensor is going to fail is not known, there is no attempt to model the failures exactly. Instead, the model for the i-th failure mode does not use the i-th measurement at all. The additional no-fault model uses all available M sensor signals. Thus, for the present embodiment, the only difference between different models is the subset of the sensors used for the correction step. Each of the M models associated with different failure modes uses M−1 sensors, and the no-fault model uses all M sensors. If the measurement prediction for the no-fault model is $$\hat{y}_{k+1}^{(0)} = g^{(0)}(\hat{x}_{k+1|k}^{(0)})$$

then the prediction for the i-th failure mode may be expressed as $$\hat{y}_{k+1}^{(i)} = g^{(i)}(\hat{x}_{k+1|k}^{(i)}) = G^{(i)} f^{(0)}(\hat{x}_{k+1|k}^{(i)})$$

where $G^{(i)}$ is an m−1 by mn sensor selection matrix, which is the identity matrix with its i-th row removed. Innovation for this model may be calculated as:

$$e_{k+1}^{(i)} = y_{k+1}^{(i)} - \hat{y}_{k+1|k}^{(i)} = G^{(i)}(y_{k+1} - g^{(0)}(\hat{x}_{k+1|k}^{(i)})).$$

Accordingly, the same measurement prediction function $g^{(0)}$ can be used by all models, which differ only by the sensor selection matrices $G^{(i)}$. This fact may be used to reduce computational requirements of certain variants of the multiple-model estimation in the processor 48.

To clarify the above, let us consider the example of FIG. 5 with M=3 sensors. In this case, the full measurement vector consists of three signals $$y^{(0)} = [z_1, z_2, z_3]^T.$$

Then, the three reduced measurement signals for each of the three possible failure modes are $$y^{(1)} = [z_2, z_3]^T$$
$$y^{(2)} = [z_1, z_3]^T$$
$$y^{(3)} = [z_1, z_2]^T$$

Sensor selection matrices for the four models may be:

$$G^{(0)} = \begin{bmatrix} 1 & 0 & 0 \\ 0 & 1 & 0 \\ 0 & 0 & 1 \end{bmatrix}, \quad G^{(1)} = \begin{bmatrix} 0 & 1 & 0 \\ 0 & 0 & 1 \end{bmatrix},$$

$$G^{(2)} = \begin{bmatrix} 1 & 0 & 0 \\ 0 & 0 & 1 \end{bmatrix}, \text{ and } G^{(3)} = \begin{bmatrix} 1 & 0 & 0 \\ 0 & 1 & 0 \end{bmatrix}.$$

Now, let us refer back to the fusion stage comprising modules 64 and 66 of FIG. 3. Suppose that there are K competing state estimators in the multiple-model stage 62 which are all of the Kalman filter type, each utilizing a different model of the system. Suppose that prior to measurement at moment k+1, an i-th estimator produced its own state estimate $\hat{x}_{k+1|k}^{(i)}$, its covariance $\Sigma_{k+1|k}^{(i)}$, the predicted measurement value $\hat{y}_{k+1}^{(i)}$, and the innovation covariance $S_{k+1}^{(i)}$ as described herein above. Assume also that based on observations collected so far, probability that the i-th model is the correct one has been assessed by the likelihood value $P_{k+1|k}^{(i)}$. Then, after the measurement $y_{k+1}$ arrives, each of the estimators performs its own state update $\hat{x}_{k+1|k+1}^{(i)}$ and calculates an updated covariance $\Sigma_{k+1|k+1}^{(i)}$. In addition, for each estimator there is an innovation $e_{k+1}^{(i)} = y_{k+1} - \hat{y}_{k+1|k}^{(i)}$, and the associated likelihood of the observed measurement $$p_{k+1}^{(i)} \equiv p(y_{k+1} | \hat{y}_{k+1|k}^{(i)}, S_{k+1}^{(i)}) = \frac{\exp\left(-\frac{1}{2} e_{k+1|k}^{(i)}{}^T (S_{k+1}^{(i)})^{-1} e_{k+1|k}^{(i)}\right)}{\sqrt{(2\pi)^m \det(S_{k+1}^{(i)})}}.$$

At this point, the Bayes formula which will be better understood from the following paragraphs may be used to update the probabilities of the competing models according to the following formula:

$$P_{k+1|k+1}^{(i)} = \frac{p_{k+1}^{(i)} P_{k+1|k}^{(i)}}{\sum_{j=1}^{K} p_{k+1}^{(j)} P_{k+1|k}^{(j)}}.$$

With the posterior probabilities calculated, the fused final estimate of module 64 and its approximate covariance is calculated using formula for approximation of mixture of Gaussian densities as follows:

$$\hat{x}_{k+1} = \sum_{i=1}^{K} P_{k+1|k+1}^{(i)} \hat{x}_{k+1|k+1}^{(i)}, \text{ and}$$

$$\Sigma_{k+1} = \sum_{i=1}^{K} P_{k+1|k+1}^{(i)} (\Sigma_{k+1|k+1}^{(i)} + v_{k+1}^{(i)} v_{k+1}^{(i)}{}^T),$$

where terms $v_{k+1}^{(i)}$ represent the spread of means of all estimators around the weighted average $\hat{x}_{k+1}$:

$$v_{k+1}^{(i)} = \hat{x}_{k+1} - \hat{x}_{k+1|k+1}^{(i)}.$$

The above formulae lay the foundation of the multiple-model estimation architecture of the present embodiment.

The difference between different algorithms lies in the way in which the prior estimates $\hat{x}_{k+1|k}^{(i)}, \Sigma_{k+1|k}^{(i)}$, and $P_{k+1|k}^{(i)}$ (to be used in the next iteration k+1) are calculated from the posterior estimates $\hat{x}_{k|k}^{(i)}, \Sigma_{k|k}^{(i)}$, and $P_{k|k}^{(i)}$ (generated in the previous iteration k).

As referred to herein above, there are at least three variants suitable for embodying the multiple-model architecture of the present embodiment. The simplest multiple-model estimation structure is referred to as a zero-order approximate filter (ZOA filter). In this configuration, the multiple models run separately, with no interactions between their internal state. The only mixing of the estimates is the calculation of the fused state estimate in module 64, as described in the previous section. The prediction of the next state and measurement in each filter model is based only on its own previous estimate:

$$\hat{x}_{k+1|k}^{(i)} = f(\hat{x}_{k|k}^{(i)})$$

$$\hat{y}_{k+1|k}^{(i)} 32\ g^{(i)}(\hat{x}_{k+1|k}^{(i)}) = G^{(i)} g(\hat{x}_{k+1|k}^{(i)})$$

For calculation of appropriate covariance matrices, separate Jacobian matrices $A_k^{(i)}$ and $B_k^{(i)}$ are obtained for each filter by linearizing function $f$ around the posterior estimates $\hat{x}_{k|k}^{(i)}$ from the previous moment k, and Jacobians $C_{k+1}^{(i)}$ are found by linearizing g around the predicted estimates $\hat{x}_{k+1|k}^{(i)}$. As a starting condition, the algorithm needs initial state estimates $\hat{x}_{0|0}^{(i)}$ for each of the competing models, as well as prior probabilities $P_{0|0}^{(i)}$.

Figure 12:
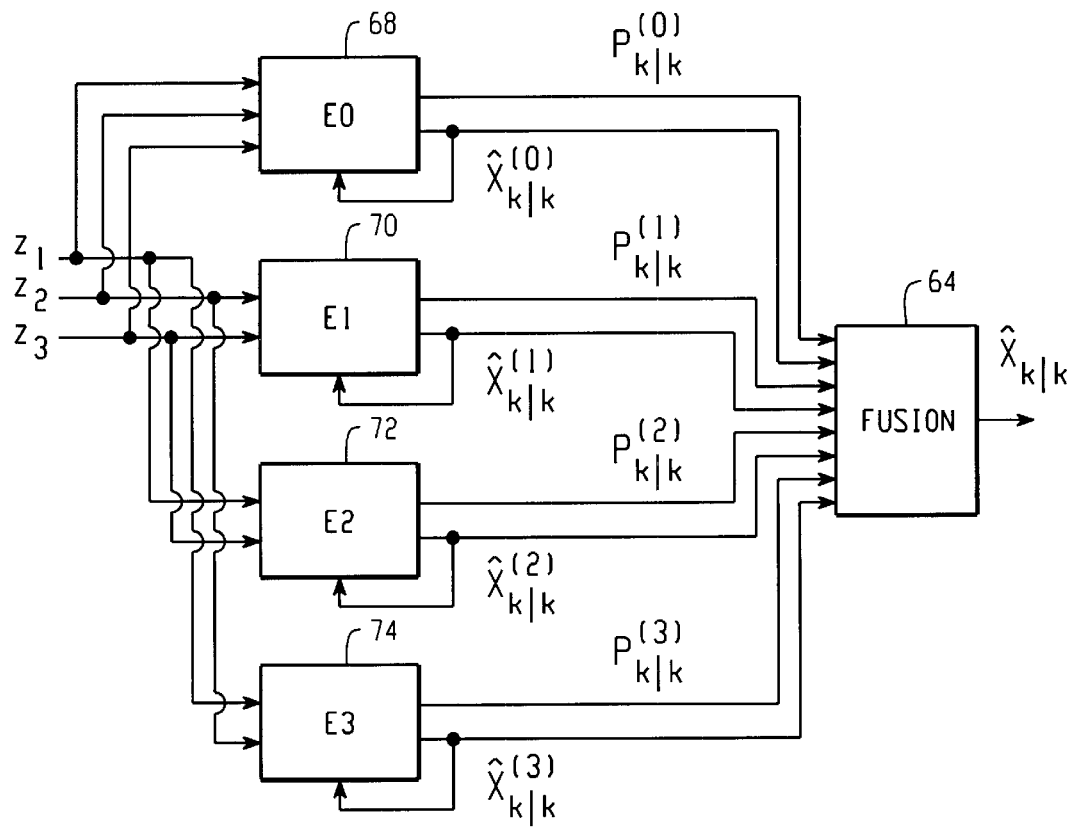
FIG. 12 is a block diagram schematic of a zero order approximate architecture suitable for embodying the multiple model architecture of the embodiment of FIG. 3.

In our three-sensor example of FIG. 5, the flow of information in the ZOA algorithm would be as shown in the block diagram schematic of FIG. 12. Validity of this ZOA algorithm is based on the assumption that one of the competing models 68, 70, 72 or 74 is correct at all times—in our context either the same single sensor is faulty all the time, or all sensors are operational. Because of this, the a priori probability at the beginning of step k+1 is the same as the a posteriori probability at the end of step k $$P_{k+1|k}^{(i)} = P_{k|k}^{(i)}.$$

Thus, prior to a fault, all models are expected to produce predictions consistent with observations, and therefore their probabilities should remain positive. Only after a fault has occurred, a single model will start to dominate the fused estimate, and probabilities of others will start converging to zero. Accordingly, non-interacting multiple models are advantageous in that there is no interactions between model estimators—no additional risk of instability or convergence to local minima and, the mixing formula is considered quite straight forward. In addition, the M+1 independent recursive estimators (e.g. EKF's) running in parallel may be programmed with ease in an algorithm executable by the processor 48.

Figure 13:
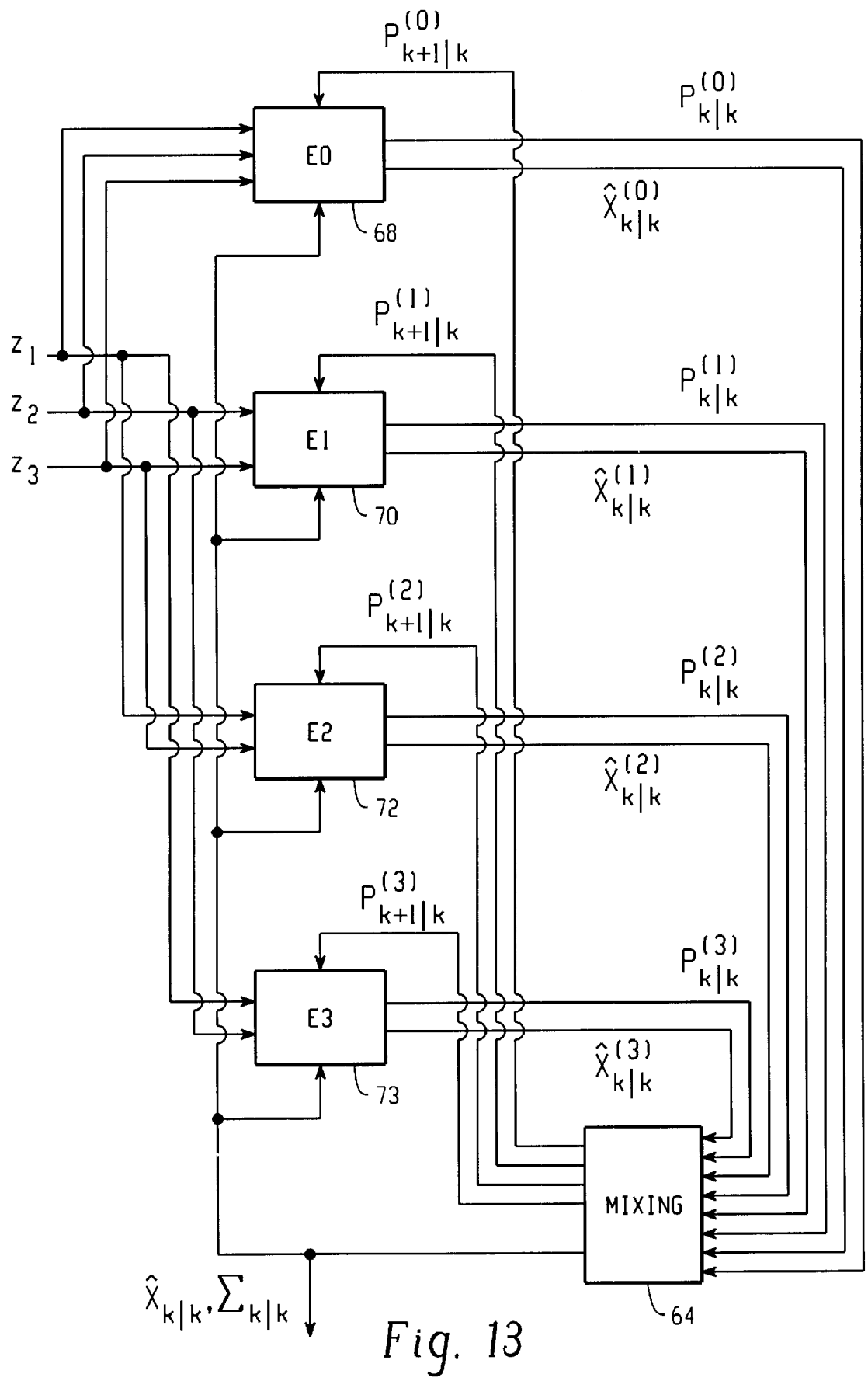
FIG. 13 is a block diagram schematic of a generalized psuedo-Bayesian I architecture suitable for embodying the multiple model architecture of the embodiment of FIG. 3.

A second variant suitable for use as the multiple-model architecture may be an approximation of the optimal Bayesian estimation for a system that may switch from one operational regime to another, dubbed "generalized pseudo-Bayesian I" or GPBI. This variant is exemplified by the block diagram schematic of FIG. 13 which is patterned after the simple 3 sensor measurement example described in connection with the embodiment of FIG. 5. Unlike the non-interacting technique, it is based on the assumption that the system configuration (or operational regime) may change randomly at any time. The system is modeled as a Markov chain—that is probability of a switch from regime (or model) i to regime j depends only on the current regime, and is not dependent on history of previous switches. This makes it possible to recover from a misdiagnosed fault or to detect temporary sensor failures.

A design parameter of the GPBI algorithm is the matrix of transition probabilities $P_T$, whose elements $p_{i,j}$ are a priori probabilities that a switch from model i to model j may occur at any given iteration. The transition probabilities are used to calculate the prior probability of model i at the start of iteration k+1 as a function of all posterior probabilities at the end of iteration k $$P_{k+1|k}^{(j)} = \sum_{i=1}^{K} p_{i,j} P_{k|k}^{(i)}.$$

Because of this, model j may be still a viable option at iteration k+1 even if it was unlikely at iteration k, provided that a switch from some other, more likely model is possible.

Another significant difference between the GPBI and ZOA approach is that at each iteration all estimators make their temporal predictions using as a starting condition the same fused (weighted) estimate $\hat{x}_{k|k}$ from the previous iteration. In addition, for the temporal update they all use the same fused covariance $\Sigma_{k|k}$. This is visible in FIG. 13, which shows the general structure of GBPI for our three-sensor example. In this fault tolerant configuration, computations in GPBI algorithm may be significantly simplified. Because all models 68, 70, 72 and 74 use the same state transition and measurement function, this means that their a priori estimates $\hat{x}_{k+1|k}^{(i)}$ will be equal to the same value $\hat{x}_{k+1}$, calculated from $\hat{x}_{k|k}$. Similarly, all estimators utilize the same covariance matrix $\Sigma_{k+1|k}$ calculated from the fused covariance $\Sigma_{k|k}$.

$$\hat{x}_{k+1|k}^{(i)} = \hat{x}_{k|k+1} = f(\hat{x}_{k|k})$$

$$\Sigma_{k+1|k}^{(i)} = \Sigma_{k+1|k} = A_k \Sigma_{k|k} A_k^T + B_k Q B_k^T$$

Jacobian matrices $A_k$ and $B_k$ are also calculated once per iteration—linearization is performed around the single point $\hat{x}_{k|k}$. Prediction of measurement values is performed only once as well, since measurement vectors of different models differ only by exclusion of single elements.

$$\hat{y}_{k+1|k}^{(i)} = G^{(i)} \hat{y}_{k+1|k} = G^{(i)} g(\hat{x}_{k+1|k})$$

All other computations are performed as described herein above for the general multiple-model approach.

Using an EKF as the model, evaluation of nonlinear functions $f$, $g$, and calculation of their Jacobian matrices may take most of the computation time of the processor 48. Therefore, the execution time of GBPI algorithm may be much better than that of ZOA. On the other hand, the fused covariance matrix $\Sigma_{k|k}$ is not used in ZOA algorithm, and its computation may be omitted, while in GPBI $\Sigma_{k|k}$ is calculated. If a factorized implementation of covariance matrices is used for numerical stability purposes, refactorization of $\Sigma k|k$ from all $\Sigma_{k|k}^{(i)}$ may constitute a significant additional effort. However, the GPBI approach is considered advantageous because the computational load significantly is smaller than in ZOA, i.e. nonlinear prediction and temporal update performed once per iteration, and detection of temporary faults and recovery from misdiagnosis are possible.

Figure 14:
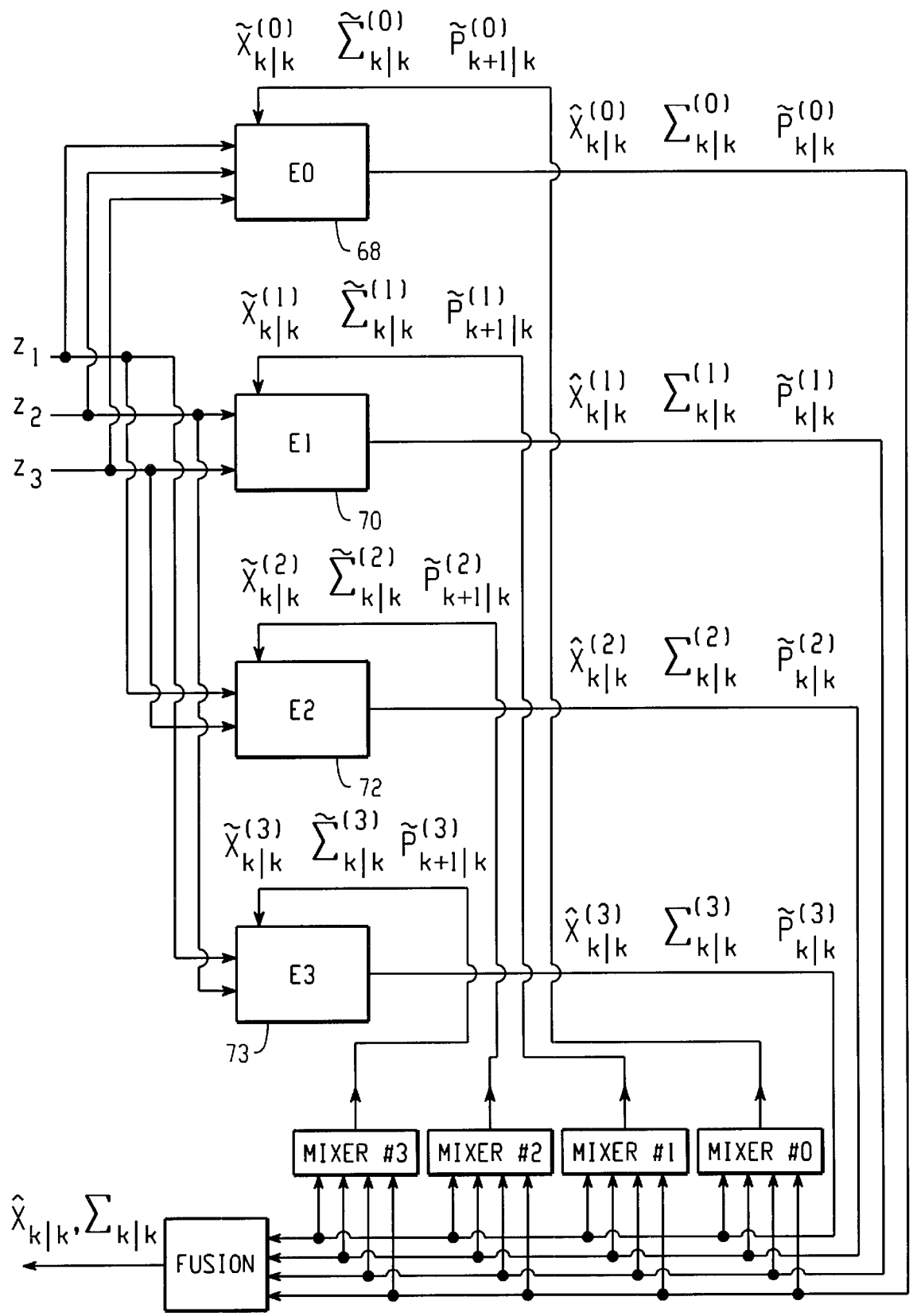
FIG. 14 is a block diagram schematic of an interactive multiple models architecture suitable for embodying the multiple model architecture of the embodiment of FIG. 3.

A third variant known as the interactive multiple models (IMM) approach is shown in the block diagram schematic of FIG. 14 which is also patterned after the simple 3 sensor example of FIG. 5. In this approach, global pooling of a posteriori estimates for all models is replaced by local mixing of a priori estimates for each model separately. As in GPBI, the design parameter is the transition probability matrix $P_T$. Its elements $p_{i,j}$ are used at the beginning of each iteration to calculate mixing coefficients $\mu_k^{i,j}$, which are interpreted as probabilities that model i was in effect during previous iteration and that model j is in effect during current iteration. Since such a transition has a priori probability $p_{ij}$, the mixing coefficients are calculated as follows $$\mu_k^{i,j} = \frac{p_{i,j} P_{k|k}^{(i)}}{\sum_{l=1}^{K} p_{l,j} P_{k|k}^{(l)}}.$$

Note that the expression in the denominator is in fact the a priori probability that model j is in effect during current operation, calculated as in GPBI algorithm $$P_{k+1|k}^{(j)} = \sum_{l=1}^{K} p_{l,j} P_{k|k}^{(l)}$$

Then for each model, prior to the temporal update step, state estimates and covariance are mixed:

$$\tilde{x}_{k|k}^{(j)} = \sum_{i=1}^{K} \mu_k^{i,j} \hat{x}_{k|k}^{(i)}$$

$$\tilde{\Sigma}_{k|k}^{(j)} = \sum_{i=1}^{K} P_{k|k}^{(i,j)}(\Sigma_{k|k}^{(i)} + \tilde{v}_k^{(i,j)} \tilde{v}_k^{(i,j)T})$$

where terms $\tilde{v}_k^{(i,j)}$ represent the spread of non-mixed estimates around the mixed j-th estimate $$\tilde{x}_{k|k}^{(j)}$$
$$v_k^{(i,j)} = \hat{x}_{k|k}^i - \tilde{x}_{k|k}^{(i,j)}$$

The prediction step is performed for each estimator separately, using the mixed values $\tilde{x}_{k|k}^{(j)}$ and $\tilde{\Sigma}_{k|k}^{(j)}$.

$$\hat{x}_{k+1|k}^{(j)} = f(\tilde{x}_{k|k}^{(j)})$$
$$\Sigma_{k+1|k}^{(j)} = A_k^{(j)} \tilde{\Sigma}_{k|k}^{(j)} A_k^{(j)T} + B_k^{(j)} Q B_k^{(j)T}$$
$$\hat{y}_{k+1|k}^{(j)} = G^{(j)} g(\hat{x}_{k+1|k}^{(j)})$$

Calculation of Jacobian matrices in IMM is performed separately for each estimator, since the corresponding nonlinear functions are linearized around different points. In one embodiment, the function $f$ may be identity, therefore it does not have to be linearized, and the mixing step may in fact be performed after the temporal update of state covariance matrix. Still, measurement prediction and linearization of function g is performned with a different argument $\hat{x}_{k+1|k}^{(j)}$ for every model, as in the ZOA architecture. Thus, in a general case IMM has computational complexity greater than the non-interacting ZOA algorithm. The additional cost comes from the mixing operation—in particular from calculation of mixed covariance matrices $\tilde{\Sigma}_{k|k}^{(j)}$.

The final estimate output to the outside world is calculated in block 64 as in GPBI and ZOA algorithms—through a weighted sum using probabilities $P_{k|k}^{(j)}$. Unlike in GPBI, though, the fused estimate $\hat{x}_{k+1|k+1}$ is not used internally within the estimator. The IMM approach is considered advantageous because each hypothetical model "lives" its own life, i.e. less likely hypotheses are not lost. Also it has an easy recovery from misdiagnosis and a better approximation of optimal Bayesian estimator.

While the multiple model estimator architecture of the preferred embodiment has been described herein above in connection with the three foregoing described variants, there are clearly other possible variants that may be used just as well. Accordingly, the present invention should not be limited to the particular multiple model architecture being used, but rather construed in its broadest scope regardless of how the final mixing and likelihood computation is being performed.

Referring back to the embodiment of FIG. 3, the likelihood values of the competing multiple models of stage 62 may be processed by a fault detection module 66 in order to detect and isolate a faulty measurement, if one is present. In one embodiment, the fault detector 66 first normalizes the likelihood values of the competing models and then compares them to a predetermined threshold to provide an indication of the failed sensor or faulty measurement signal thereof. It is preferred that the likelihood value exceed the threshold for a prolonged period of time to prevent or mitigate premature false detection of a faulty measurement signal. For this reason, the thresholding step may be based on some statistical signal processing, like time averaging the likelihood values of current and past likelihood signals of each model with a sliding window in time, for example. However, it is understood that this is but one possibility for fault detection and other appropriate signal statistics may be used as indicators as well. In addition, the fault indication signal generated by module 66 may be used to flag the stage 60 of a failed sensor or faulty measurement signal. In response, to the fault indication, the stage 60 may remove the corresponding sensor from those sensors considered available and re-partition the remaining sensor measurement signals into sets or subsets. Accordingly, the multiple-model architecture will be altered to accommodate the new sensor subsets.

Still further, if a sensor interface with BIT circuitry, like the USI, for example, is included in the present embodiment such as that shown in the block diagram schematic of FIG. 6, then there would be provided two distinct fault detection stages, i.e. the USI-based BIT circuitry and the fault detection of module 66 in the data fusion stage. In this embodiment, the USI-based fault detection circuitry may either independently or in response to the fault indication signal provided thereto switch out the sensor considered failed from the available sensor measurement signals it passes along to the stage 60, thereby pre-screening for sensor faults. This pre-screening will reduce the amount of down stream post processing in processor 48 and may permit for a liquid gauging system that is tolerant of more than just a single fault.

Figure 15:
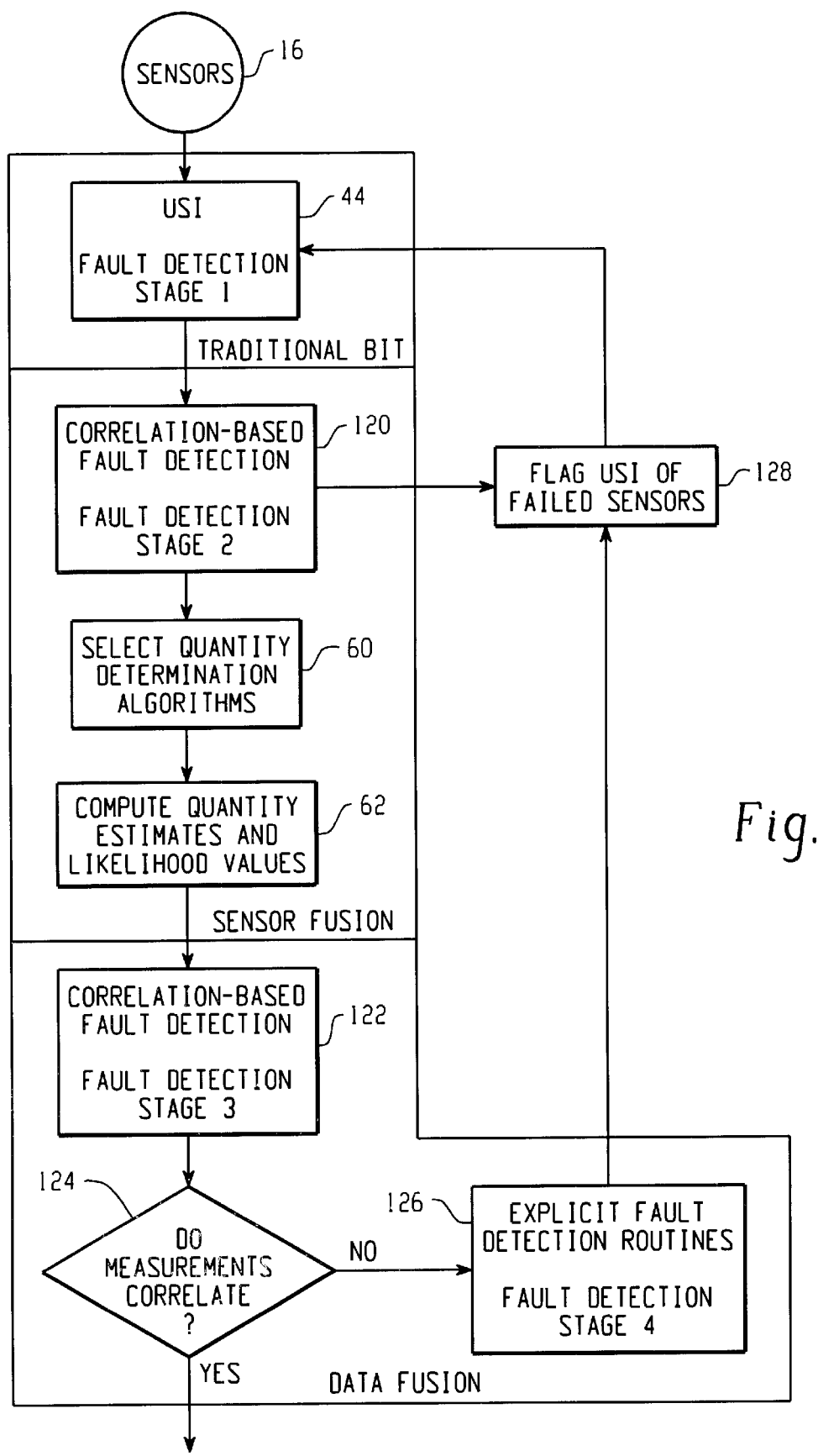
FIG. 15 is a block diagram schematic of an alternate embodiment to the embodiment of FIG. 3.

A still further embodiment of the present invention is shown in the functional block diagram schematic of FIG. 15. This embodiment includes several levels of fault identification and isolation as part of an overall fault tolerant liquid gauging system similar to that described herein above. Referring to FIG. 15, at stage 1, which may include a sensor interface, like one or more of the USI modules 44, for example, raw or relatively unprocessed sensor measurement signals from sensors 16 are analyzed by traditional BIT circuits using conventional fault detection techniques. The USI modules 44 allows the system 12 to use a variety of signals to stimulate the individual sensors 16 and facilitate analysis of their response to these stimuli for fault detection. The USI modules 44 may also sample the time varying measurement signals at predetermined intervals in time for providing current and past samples thereof For more details of a suitable USI module reference is made to the above referenced patent application bearing application Ser. No. 08/997,271.

A second fault detection stage 120 is included for verifying that each current sample of an individual sensor measurement signal passed by stage 1 correlates with current samples of the measurement signals from other sensors 16 for reasonableness, for example, and with past samples of the same measurement signal for consistency, for example. Those sensor signals that do not correlate according to a predetermined criteria are considered faulty and not passed on to the next stages 60 and 62. Next, the measurement signals of the available sensors from the pre-screening of stages 1 and 2, i.e. those sensors not identified as failed or producing faulty measurement signals, are processed by the stages 60 and 62 in a similar manner as that described for the embodiment of FIG. 3. A liquid quantity state estimate is determined by each of the models of stage 62 notwithstanding that one of the available sensors measurement signals being processed thereby may, in fact, be faulty. In a fault detection stage 122 referred to as stage 3 all of the liquid quantity estimates are fused based on a predetermined data fusion function. Then, if the liquid quantity estimates correlate as determined by the decisional block 124, then the estimates are combined or fused to provide the final estimate. If the state estimates of liquid quantity do not correlate in block 124, then further fault analysis may be performed in block 126 or stage 4. In stage 4, information may be used from other sources to correlate with the state estimates in order to identify and isolate a sensor failure or faulty measurement. Accordingly, if either block 120 or block 126 provides a fault indication, it is detected by block 128 which, in turn, flags the USI modules 44 to inhibit further processing of the measurement signals of the sensor considered faulty.

While the present invention has been described herein above in connection with one or more specific embodiments, it is understood that it should not be limited in any way, shape or form to any single embodiment, but rather construed in broad scope and breadth in accordance with the recitation of the appended claims.

We claim:

1. A fault tolerant liquid measurement system comprising:
  a plurality of sensors for measuring parameters of a liquid in a container; each said sensor generating a time varying measurement signal representative of the liquid parameter measured thereby;
  means for grouping said sensors into a number of sets, each set including some sensors of another set;
  means for providing current and past measurement samples of each measurement signal; and
  processing means for processing said current and past measurement samples of the measurement signals of each set of sensors to determine for each set of sensors a current first estimate signal representative of a likelihood of measurement signal validity for said measurement signals of the corresponding set, and a current second estimate signal representative of liquid quantity in said container based on said current and past measurement samples of the measurement signals of the corresponding set, said processing means for determining a third estimate signal of liquid quantity in said container based on a function of said first and second estimate signals.

2. The system of claim 1 wherein the grouping means includes means for grouping all of the sensors of the plurality into one of said number of sets.

3. The system of claim 1 wherein the grouping means includes means for grouping sensors into a corresponding plurality of sets that each include all of said plurality of sensors except one and said missing sensor in each said set is a different sensor of said plurality.

4. The system of claim 1 wherein the processing means includes means for processing the measurement signals of each set using an algorithm based on a state estimation model to determine the first and second estimate signals.

5. The system of claim 4 wherein the algorithm comprises a state estimation model for each set of sensor measurement signals to represent a multiple-model estimation computational structure.

6. The system of claim 5 wherein the multiple-model structure comprises a non-interactive multiple-model structure.

7. The system of claim 5 wherein the multiple-model structure comprises a generalized psuedo-Bayesian multiple-model structure.

8. The system of claim 5 wherein the multiple-model structure comprises an interactive multiple-model structure.

9. The system of claim 5 wherein at least one of the state estimation models is of the Kalman filter type.

10. The system of claim 5 wherein at least one of the state estimation models is of the neural network type.

11. The system of claim 10 wherein the at least one neural network is trained with training sets comprising measurement signals representative of no-fault and single-fault conditions.

12. The system of claim 1 wherein the processing means includes means for determining the third estimate signal based on a fusion of the second estimate signals weighted by their respectively corresponding first estimate signals.

13. The system of claim 1 wherein the processing means includes means for detecting a faulty measurement signal based on a function of said first estimate signals.

14. The system of claim 1 wherein the processing means includes means for detecting a faulty measurement signal based on a function of the current first estimate signals.

15. The system of claim 1 wherein the processing means includes means for generating a time averaged current first estimate signal for each set of sensors, and means for detecting and isolating a faulty measurement signal based on a function of said time averaged current first estimate signals.

16. The system of claim 15 wherein the processing means includes means for detecting and isolating a faulty measurement signal based on a comparison of said time averaged current first estimate signals with a predetermined threshold signal.

17. The system of claim 1 wherein the processing means includes means for processing the current and past samples of the measurement signals of each set with an extended Kalman filter algorithm.

18. The system of claim 1 wherein the processing means includes means for processing the current and past samples of the measurement signals of each set with a time delay neural network algorithm.

19. The system of claim 1 wherein the grouping means includes means for grouping sensors into a plurality of sets that each include all of said plurality of sensors except one and said missing sensor in each said set is a different sensor of said plurality; and the processing means includes means for isolating a faulty measurement signal by detecting a set of sensors not including a faulty measurement signal based on a function of said first estimate signals.

20. The system of claim 19 wherein the isolating means includes means for detecting the set of sensors not including a faulty measurement signal based on a comparison of said first estimate signals with a predetermined threshold signal.

21. The system of claim 1 including sensor interface means coupled to the plurality of sensors for pre-testing the measurement signals thereof for a measurement signal considered faulty based on said testing; and wherein the grouping means includes means for grouping only those sensors not associated with the measurement signal considered faulty by said sensor interface means into the number of sets.

22. The system of claim 1 including a correlating means for correlating said current and past measurement samples of each measurement signal to determine a faulty measurement signal; and wherein the grouping means includes means for grouping only those sensors not associated with the measurement signal considered faulty by said correlating means into the number of sets.

23. The system of claim 1 wherein the processing means includes means for detecting and isolating a faulty measurement signal based on a function of said first estimate signals; and wherein the grouping means includes means for grouping only those sensors not associated with the measurement signal considered faulty by said processing means into the number of sets.

24. The system of claim 1 wherein the processing means includes means for processing the measurement signals of each set of sensors to determine for each set of sensors the first estimate signal representative of a likelihood that all measurement signals of the corresponding set are valid.

25. The system of claim 1 wherein the processing means includes means for determining the third estimate signal by combing the second estimate signals weighted by their corresponding first estimate signals.

26. In liquid measurement apparatus comprising a plurality of sensors for measuring parameters of a liquid in a container; each said sensor generating a time varying measurement signal representative of the liquid parameter measured thereby, a system for detecting a faulty measurement signal comprising:
 means for grouping said sensors into a number of sets, each set including some sensors of another set;
 means for providing current and past measurement samples of each measurement signal; and
 processing means for processing said current and past measurement samples of the measurement signals of each set of sensors to determine for each set of sensors a current signal representative of a likelihood that at least one of said measurement signals of the corresponding set is a faulty measurement signal, said processing means for detecting a faulty measurement signal of liquid quantity in said container based on a function of said likelihood signals.

27. The system of claim 26 wherein the grouping means includes means for grouping all of the sensors of the plurality into one of said number of sets.

28. The system of claim 26 wherein the grouping means includes means for grouping sensors into a plurality of sets that each include all of said plurality of sensors except one and said missing sensor in each said set is a different sensor of said plurality.

29. The system of claim 26 wherein the processing means includes means for processing the measurement signals of each set using an algorithm based on a state estimation model to determine the likelihood signals.

30. The system of claim 29 wherein at least one of the state estimation models is of the Kalman filter type.

31. The system of claim 29 wherein at least one of the state estimation models is of the neural network type.

32. The system of claim 31 wherein the at least one neural network is trained with training sets comprising measurement signals representative of no-fault and single-fault conditions.

33. The system of claim 26 wherein the processing means includes means for detecting a faulty measurement signal based on a function of the current likelihood signals.

34. The system of claim 26 wherein the processing means includes means for generating a time averaged current likelihood signal for each set of sensors, and means for detecting and isolating a faulty measurement signal based on a function of said time averaged current likelihood signals.

35. The system of claim 34 wherein the processing means includes means for detecting and isolating a faulty measurement signal based on a comparison of said time averaged current likelihood signals with a predetermined threshold signal.

36. The system of claim 26 wherein the processing means includes means for processing the current and past samples of the measurement signals of each set with an extended Kalman filter algorithm.

37. The system of claim 26 wherein the processing means includes means for processing the current and past samples of the measurement signals of each set with a time delay neural network algorithm.

38. The system of claim 26 wherein the grouping means includes means for grouping sensors into a plurality of sets that each include all of said plurality of sensors except one and said missing sensor in each said set is a different sensor of said plurality; and the processing means includes means for isolating a faulty measurement signal by detecting a set of sensors not including a faulty measurement signal based on a function of said likelihood signals.

39. The system of claim 38 wherein the isolating means includes means for detecting the set of sensors not including a faulty measurement signal based on a comparison of said likelihood signals with a predetermined threshold signal.

40. The system of claim 26 including sensor interface means coupled to the plurality of sensors for pre-testing the measurement signals thereof for a measurement signal considered faulty based on said testing; and wherein the grouping means includes means for grouping only those sensors not associated with the measurement signal considered faulty by said sensor interface means into the number of sets.

41. The system of claim 26 including a correlating means for correlating said current and past measurement samples of each measurement signals to determine a faulty measurement signal; and wherein the grouping means includes means for grouping only those sensors not associated with the measurement signal considered faulty by said correlating means into the number of sets.

42. The system of claim 26 wherein the processing means includes means for detecting and isolating a faulty measurement signal based on a function of said likelihood signals; and wherein the grouping means includes means for grouping only those sensors not associated with the measurement signal considered faulty by said processing means into the number of sets.

43. A fault tolerant liquid measurement system comprising:
 a number M of sensors for measuring parameters of a liquid in a container; each said sensor generating a time varying measurement signal representative of the liquid parameter measured thereby;
 means for grouping said M sensors into M+1 subsets, one subset including all M sensors and said other M subsets each including all of said M sensors except one and said missing sensor in each of said other M subsets is a different sensor of said M sensors;
 means for providing current and past measurement samples of each measurement signal; and processing means for processing said current and past samples of the measurement signals of each subset of sensors with a respectively corresponding algorithm based on a state estimation model to determine for each subset of sensors a first estimate signal representative of a likelihood of measurement signal validity for said measurement signals of the corresponding subset, and a current second estimate signal representative of liquid quantity in said container based on said and past samples of the measurement signals of the corresponding subset; said processing means for determining a third estimate signal of liquid quantity in said container based on a function of said first and second estimate signals.

44. The system of claim 43 wherein the M algorithms of the processing means comprise a multiple-model estimation computational structure.

45. The system of claim 44 wherein the multiple-model structure comprises a non-interactive multiple-model structure.

46. The system of claim 44 wherein the multiple-model structure comprises a generalized psuedo-Bayesian multiple-model structure.

47. The system of claim 44 wherein the multiple-model structure comprises an interactive multiple-model structure.

48. The system of claim 43 wherein state estimation model is of the Kalman filter type.

49. The system of claim 43 wherein the state estimation model is of the neural network type.

50. The system of claim 49 wherein the neural network model is trained with training sets comprising measurement signals representative of no-fault and single-fault conditions.

51. The system of claim 43 wherein the processing means includes means for determining the third estimate signal based on a fusion of the second estimate signals weighted by their respectively corresponding first estimate signals.

52. The system of claim 43 wherein the processing means includes means for processing the current and past samples of the measurement signals of each subset with an extended Kalman filter algorithm.

53. The system of claim 43 wherein the processing means includes means for processing the current and past samples of the measurement signals of each subset with a time delay neural network algorithm.

54. The system of claim 43 including means for isolating a faulty measurement signal by detecting a faulty measurement signal and a subset of sensors not including the faulty measurement signal based on a function of the first estimate signals and a predetermined threshold signal.

55. The system of claim 43 wherein the processing means includes means for processing the measurement signals of each set of sensors to determine for each set of sensors the first estimate signal representative of a likelihood that all measurement signals of the corresponding set are valid.

56. The system of claim 43 wherein the processing means includes means for determining the third estimate signal by combing the second estimate signals weighted by their corresponding first estimate signals.

* * * * *

UNITED STATES PATENT AND TRADEMARK OFFICE
CERTIFICATE OF CORRECTION

PATENT NO.    : 6,502,042 B1
DATED         : December 31, 2002
INVENTOR(S)   : Eid et al.

It is certified that error appears in the above-identified patent and that said Letters Patent is hereby corrected as shown below:

<u>Title page,</u>
Item [75], Inventor, please delete the word "Zakrewski" and insert -- Zakrzewski --.

Signed and Sealed this

Twentieth Day of May, 2003

JAMES E. ROGAN
*Director of the United States Patent and Trademark Office*